US012572210B2

(12) United States Patent
Ishii et al.

(10) Patent No.: US 12,572,210 B2
(45) Date of Patent: Mar. 10, 2026

(54) VIBRATION GENERATING DEVICE

(71) Applicant: TAIYO YUDEN CO., LTD., Tokyo (JP)

(72) Inventors: Shigeo Ishii, Takasaki (JP); Takeyuki Fukushima, Takasaki (JP); Yukari Sato, Takasaki (JP); Hiroyuki Shimizu, Takasaki (JP); Yuichi Namikawa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 38 days.

(21) Appl. No.: 18/753,872

(22) Filed: Jun. 25, 2024

(65) Prior Publication Data

US 2025/0036204 A1    Jan. 30, 2025

(30) Foreign Application Priority Data

Jul. 24, 2023    (JP) ................................. 2023-120099

(51) Int. Cl.
*G06F 3/01*          (2006.01)
*G06F 3/0354*       (2013.01)
*G06F 3/038*        (2013.01)
(52) U.S. Cl.
CPC .......... *G06F 3/016* (2013.01); *G06F 3/03545* (2013.01); *G06F 3/0383* (2013.01)

(58) Field of Classification Search
CPC ..... G06F 3/016; G06F 3/03545; G06F 3/0383
See application file for complete search history.

(56) References Cited

U.S. PATENT DOCUMENTS

2021/0162457 A1*  6/2021  Ebefors .................. G10K 15/00

FOREIGN PATENT DOCUMENTS

DE        102018120760 B4 *  11/2022  ........... G06F 3/0383
JP        H08314369 A      11/1996

* cited by examiner

*Primary Examiner* — Quan Zhen Wang
*Assistant Examiner* — Mancil Littlejohn, Jr.
(74) *Attorney, Agent, or Firm* — Law Office of Katsuhiro Arai

(57)        ABSTRACT

A vibration generating device includes a vibrator, and a driving device configured to switch between a first period and a second period at a third frequency, the first period being a period during which a first signal having a first frequency of 100 Hz or higher and 400 Hz or lower is supplied to the vibrator, the second period being a period during which a second signal having a second frequency that is lower than the first frequency and is 10 Hz or higher and 250 Hz or lower is supplied to the vibrator, the third frequency being 1 Hz or higher and 100 Hz or less.

10 Claims, 17 Drawing Sheets

100

FIG. 6A
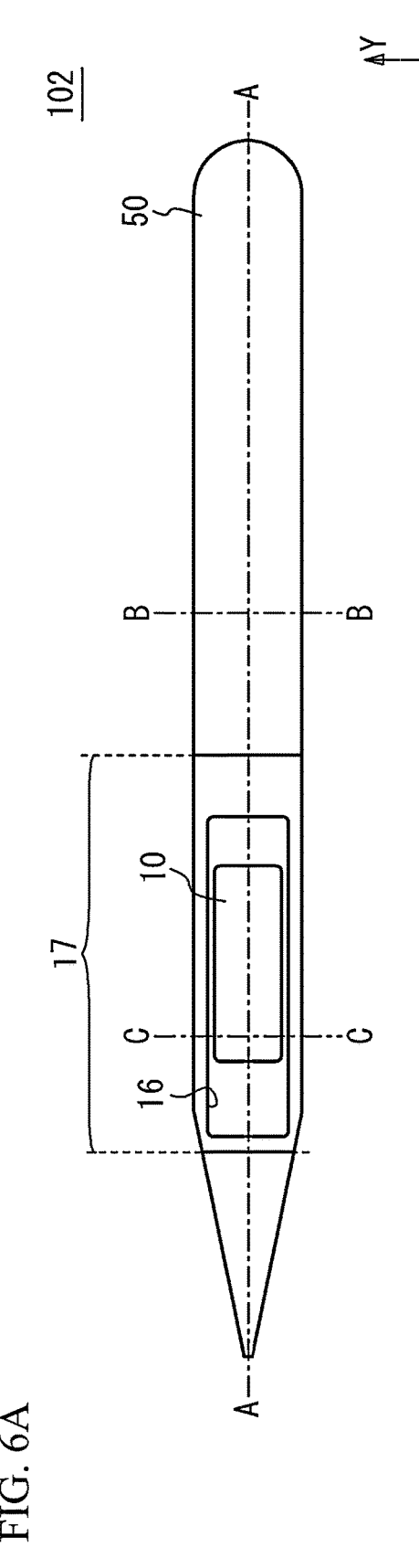
FIG. 6B
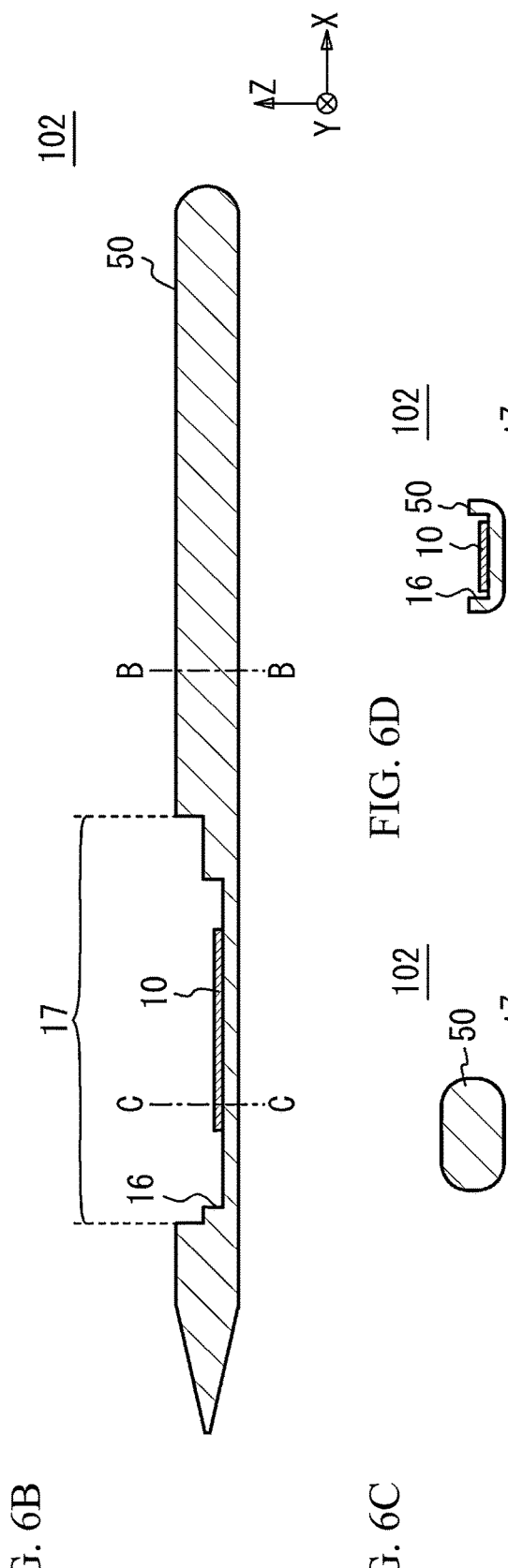
FIG. 6C
FIG. 6D

VIBRATION GENERATING DEVICE

CROSS-REFERENCE TO RELATED APPLICATION

This application is based upon and claims the benefit of priority of the prior Japanese Patent Application No. 2023-120099, filed on Jul. 24, 2023, the entire contents of which are incorporated herein by reference.

FIELD

A certain aspect of the present disclosure relates to a vibration generating device, and particularly to a vibration generating device having a vibrator.

BACKGROUND

In a vibration generating device that generates a tactile sensation by vibration of a vibrator, it is known to vibrate the vibrator using a modulated rectangular wave as disclosed in, for example, Japanese Patent Application Laid-Open No. H8-314369.

SUMMARY

However, even when the modulated rectangular wave is used, it is difficult to express a strong tactile sensation.

Therefore, an object of the present disclosure is to express a strong tactile sensation.

In one aspect, there is provided a vibration generating device including: a vibrator; and a driving device configured to switch between a first period and a second period at a third frequency, the first period being a period during which a first signal having a first frequency of 100 Hz or higher and 400 Hz or lower is supplied to the vibrator, the second period being a period during which a second signal having a second frequency that is lower than the first frequency and is 10 Hz or higher and 250 Hz or lower is supplied to the vibrator, the third frequency being 1 Hz or higher and 100 Hz or less.

In another aspect of the present disclosure, there is provided a vibration generating device including: a vibrator; and a driving device configured to switch between a first period and a second period at a third frequency, the first period being a period during which a first signal having a first frequency that is equal to or greater than 0.86 times and equal to or less than 1.14 times a resonant frequency of the vibrator is supplied to the vibrator, the second period being a period during which a second signal having a second frequency that is lower than the first frequency and is 100 Hz or higher and 400 Hz or lower is supplied to the vibrator, the third frequency being lower than the second frequency and being 1 Hz or higher and 100 Hz or lower.

BRIEF DESCRIPTION OF THE DRAWINGS

FIG. 6A is a plan view of the vibration generating device in accordance with the second embodiment, and FIG. 6B to FIG. 6D are cross-sectional views taken along lines A-A, B-B and C-C in FIG. 6A, respectively;

DETAILED DESCRIPTION

Hereinafter, embodiments will be described with reference to the drawings.

Receptors in the skin of the human body include Pacinian corpuscles, Meissner's corpuscles and Merkel's discs. Signals with frequencies to which these receptors are sensitive can give tactile sensations to the skin. By using the resonant frequency as a carrier wave and modulating the signal at frequencies to which these receptors are sensitive, a more tactile sensation can be obtained. However, even in this case, it is difficult to obtain a sufficiently strong tactile sensation. The resonant frequency of the vibrator is as high as 10 kHz or higher. Therefore, when the resonant frequency is supplied to the vibrator, the current flowing therethrough increases, and the power consumption increases. In the following embodiments, a strong tactile sensation can be obtained by performing modulation to which a frequency shift modulation technique is applied. In addition, as an example, a strong tactile sensation can be obtained without using the resonant frequency of the vibrator.

First Embodiment

Figure 1:
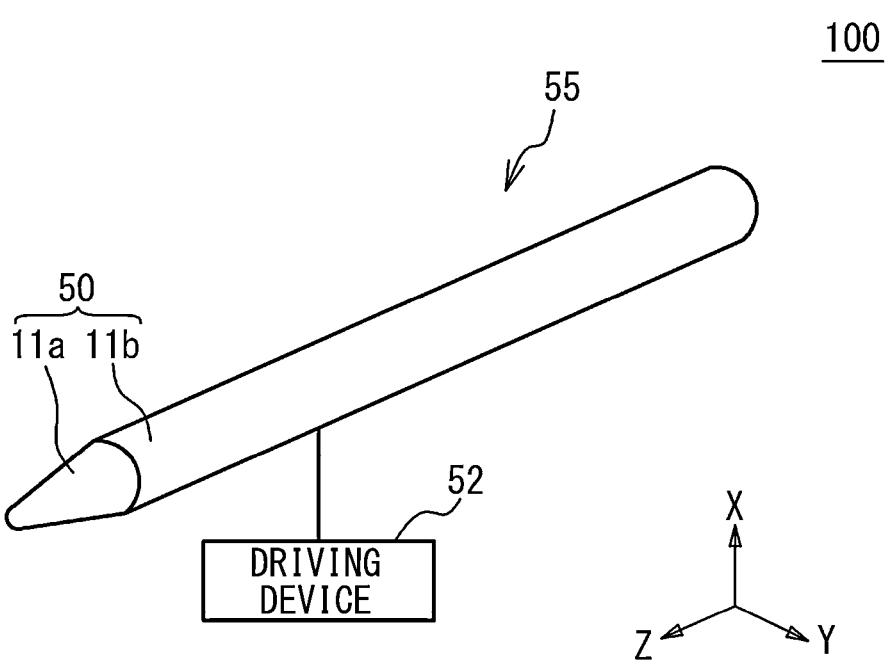
FIG. 1 is a perspective view of a vibration generating device in accordance with a first embodiment.

As a first embodiment capable of expressing a strong tactile sensation, a vibration generating device using a piezoelectric device of a longitudinal displacement mode (or d33 mode) and having a pen-type housing will be described. FIG. 1 is a perspective view of a vibration generating device in accordance with the first embodiment. As illustrated in FIG. 1, a vibration generating device 100 of the first embodiment includes a vibrator 55 and a driving device 52. The vibrator 55 has a pen-type housing 50. The housing 50 includes a member 11a and a member 11b. The member 11a has a shape of a pen tip, and the member 11b has a shape of a pen grip. The driving device 52 may be provided in the housing 50. The vibration generating device 100 is a stylus pen whose tip is brought into contact with an object such as a display panel of a tablet terminal or a smartphone. The user grasps the member 11b. The vibration of the housing 50 can provide the user with a tactile sensation.

Figure 2:
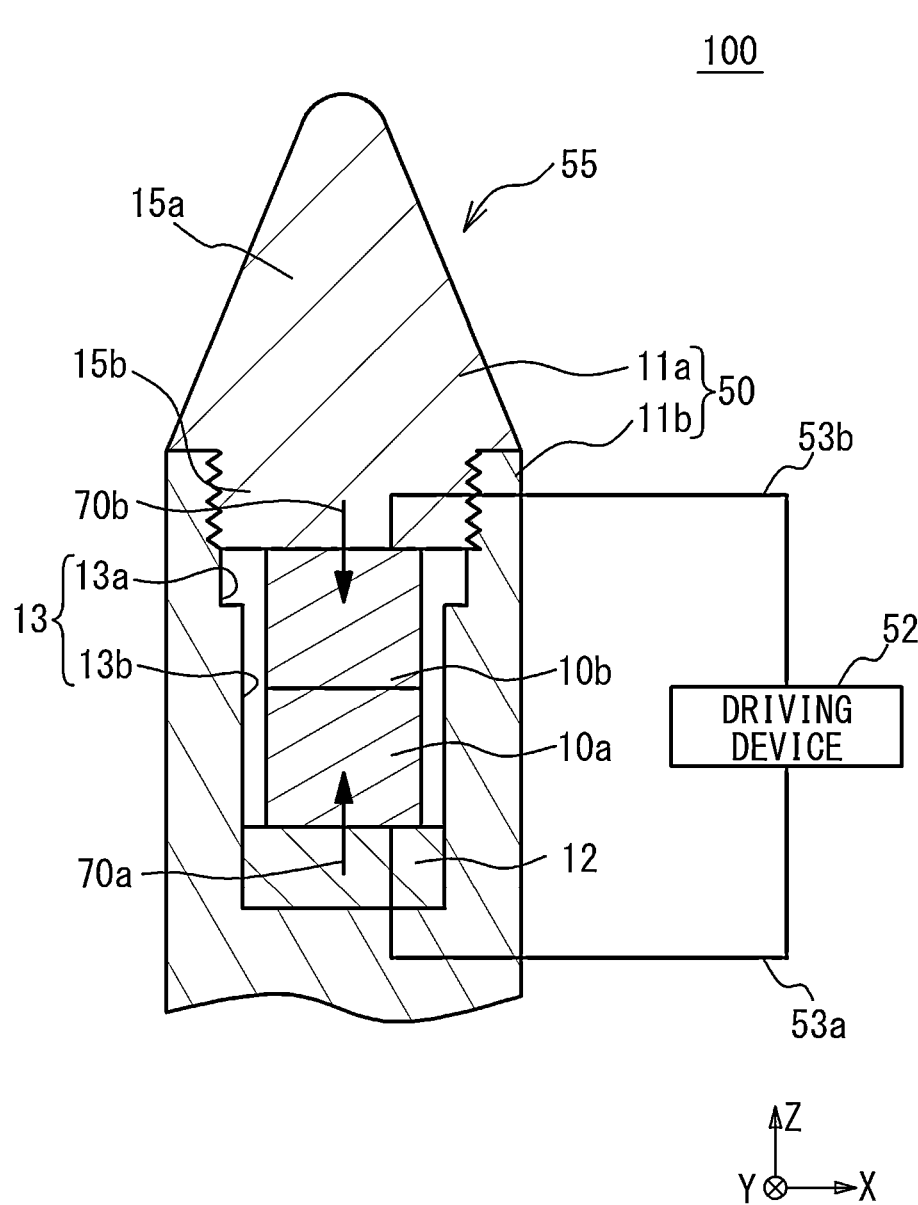
FIG. 2 is a cross-sectional view of the vicinity of the tip of the vibration generating device in accordance with the first embodiment.

FIG. 2 is a cross-sectional view of the vicinity of the tip of the vibration generating device in accordance with the first embodiment. As illustrated in FIG. 2, the members 11a and 11b are joined. A recess portion 13 is provided on the surface of the member 11b in the +Z direction. The recess portion 13 has a portion 13a provided at the +Z side and a portion 13b provided at the –Z side. The planar shape of the portion 13a is substantially circular, and the planar shape of the portion 13b is substantially rectangular. Threads that serve as a female screw is formed on a side surface of the portion 13a. No threads are formed on the side surface of the portion 13b. A support member 12 and piezoelectric elements 10a and 10b are inserted into the recess portion 13 in this order from the –Z side. The support member 12 and the piezoelectric elements 10a and 10b are not bonded to the member 11b and are movable. The support member 12 may be provided between the piezoelectric element 10b and the member 11a. Cables 53a and 53b, electrically connected to the piezoelectric elements 10a and 10b, respectively, are electrically connected to the driving device 52.

The member 11a includes a tip portion 15a provided at the +Z side and a screw portion 15b provided at the –Z side. The three-dimensional shape of the tip portion 15a is substantially conical about the Z-axis. Threads serving as a male screw are formed on the side surface of the screw portion 15b. The screw portion 15b of the member 11a is joined to the portion 13a of the recess portion 13 of the member 11b by fitting the threads together. By tightening the screws, the member 11b presses the piezoelectric element 10a in the +Z direction through the support member 12 as indicated by an arrow 70a. The member 11a presses the piezoelectric element 10b in the –Z direction as indicated by an arrow 70b. The support member 12 may not be necessarily provided, and may be provided between the member 11b and the piezoelectric element 10b.

The materials of the members 11a and 11b are, for example, metals or resins. The material of the support member 12 is a material having a Young's modulus greater than those of the members 11a and 11b and the piezoelectric elements 10a and 10b, and is, for example, stainless steel. The materials, shapes, and dimensions of the members 11a and 11b can be designed as appropriate.

Figure 3:
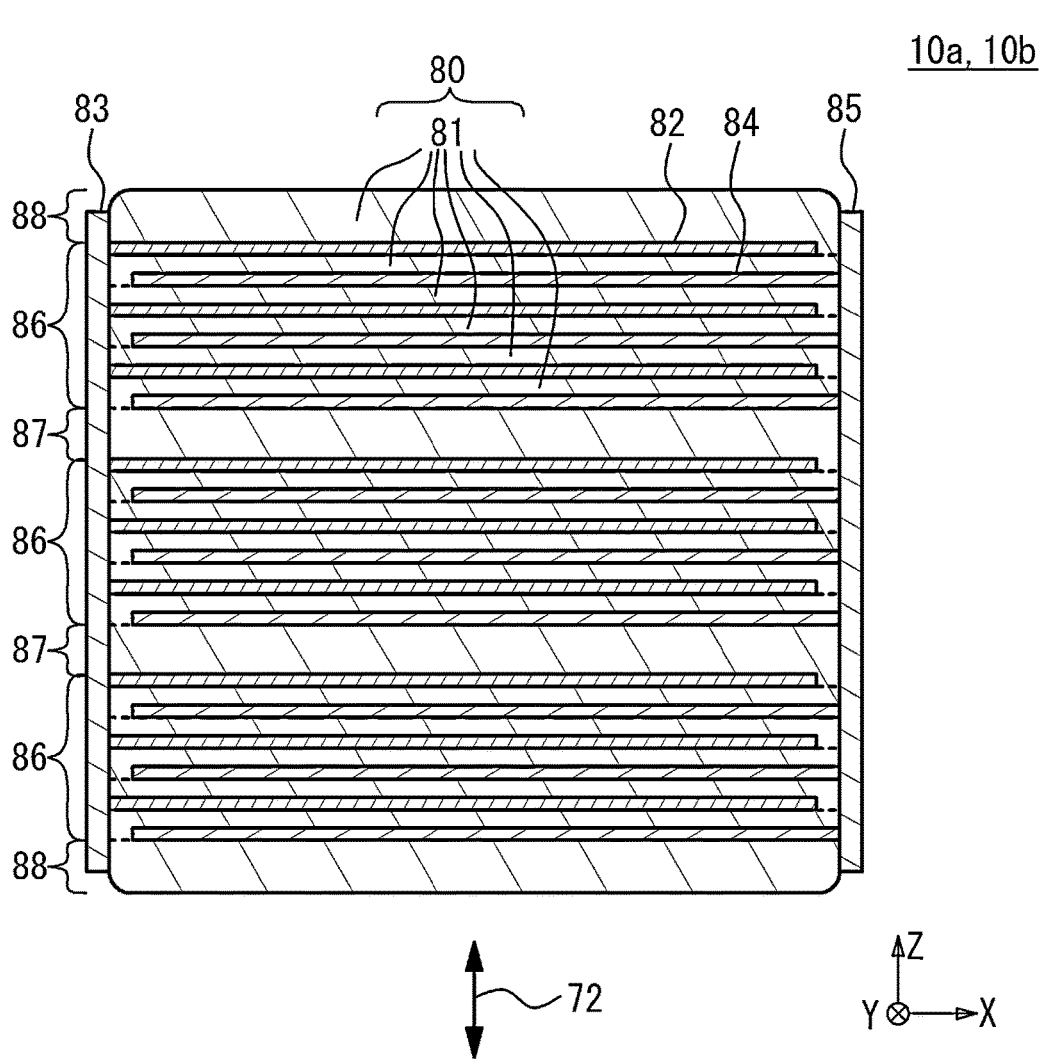
FIG. 3 is a cross-sectional view of a piezoelectric element in the first embodiment.

FIG. 3 is a cross-sectional view of the piezoelectric element in the first embodiment.

As illustrated in FIG. 3, each of the piezoelectric elements 10a and 10b includes a piezoelectric body 80 formed of a plurality of piezoelectric layers 81, a plurality of first electrodes 82, and a plurality of second electrodes 84. The piezoelectric layers 81 are stacked in the Z direction. The piezoelectric layers 81, the first electrodes 82, and the second electrodes 84 have a flat plate shape extending in the XY plane. The first electrodes 82 and the second electrodes 84 are alternately provided in the Z-direction. One piezoelectric layer 81 is interposed between one first electrode 82 and one second electrode 84 in the Z direction. A first external electrode 83 is provided on the –X-side surface of the piezoelectric body 80, and a second external electrode 85 is provided on the +X-side surface of the piezoelectric body 80. The first electrodes 82 are electrically connected to the first external electrode 83. The second electrodes 84 are electrically connected to the second external electrode 85. When a voltage is applied between the first external electrode 83 and the second external electrode 85, the piezoelectric body 80 expands and contracts in the Z direction as indicated by an arrow 72 due to the inverse piezoelectric effect. The vibration mode in which the piezoelectric body 80 expands and contracts in the Z direction in which the first electrode 82 and the second electrode 84 sandwich the piezoelectric layer 81 therebetween when a voltage is applied to to the first electrodes 82 and the second electrodes 84 is referred to as a longitudinal displacement mode or a d33 mode.

The piezoelectric body 80 includes first sections 86, second sections 87, and third sections 88. The first sections 86 and the second sections 87 are alternately provided in the Z direction. The third section 88 is provided outside the outermost first section 86 in the Z-direction. The first section 86 is a section in which the first electrodes 82 and the second electrodes 84 are alternately provided at regular intervals in the Z-direction. The number of the stacked piezoelectric layers 81 in the first section 86 is, for example, 50. The second sections 87 and the third sections 88 are sections where neither the first electrode 82 nor the second electrode 84 is provided. The second section 87 may not be necessarily provided. The reliability may be improved by providing the second section 87.

The driving device 52 of FIG. 2 supplies an alternating-current (AC) voltage between the first external electrode 83 and the second external electrode 85 of each of the piezoelectric elements 10a and 10b. Thus, as indicated by the arrow 72 in FIG. 3, the piezoelectric elements 10a and 10b expand and contract in the Z direction, and the vibration is transmitted to the housing 50. As indicated by the arrows 70a and 70b in FIG. 2, the members 11a and 11b press the piezoelectric elements 10a and 10b, and thus the Q factor of the mechanical vibration of the housing 50 can be increased.

As the material of the piezoelectric layer 81, for example, lead zirconate titanate (PZT: $Pb(Zr,Ti)O_3$), a barium titanate-based material ($BaTiO_3$, Ba may be substituted with Ca, and Ti may be substituted with Zr), a bismuth titanate-based material ($BiTiO_3$, a part of Bi may be substituted with Na), and an alkali niobate-based material ($NaNbO_3$, Na may be substituted with Li or K) can be used. Metals such as Ag, Pd, Pt, Cu, Ni, or Au can be used as materials for the first electrode 82, the second electrode 84, the first external electrode 83, and the second external electrode 85. The piezoelectric elements 10a and 10b are chips made of sintered bodies formed by stacking piezoelectric sheets with the first electrode 82 formed on the surface thereof and piezoelectric sheets with the second electrode 84 formed on the surface thereof and sintering a resulting multilayered body. The piezoelectric elements 10a and 10b have, for example, rectangular parallelepiped shapes, and the widths of the piezoelectric elements 10a and 10b in the X direction and the Y direction are, for example, 3.5 mm, and the height in the Z direction is, for example, 3 mm.

When the displacements in the Z direction on the ±Z-side surfaces of the piezoelectric elements 10a and 10b are denoted by $\Delta Z$, the number of the stacked piezoelectric layers 81 is denoted by N, the voltage applied between the first electrode 82 and the second electrode 84 is denoted by V, and the constant related to the inverse piezoelectric constant is denoted by d33, $\Delta Z = d33 \times V \times N$ is satisfied. Therefore, the displacement $\Delta Z$ is increased by increasing the number N of the stacked piezoelectric layers 81. However, due to manufacturing restrictions or the like, there are cases where the number N of stacked layers in one of the piezoelectric elements 10a or 10b cannot be increased. In such a case, the piezoelectric elements 10a and 10b can be stacked in the Z direction in the housing 50. This can increase the total amount of displacements of the piezoelectric elements 10a and 10b. The number of the piezoelectric elements 10a and 10b stacked in the Z direction may be one or three or more.

Figure 4:
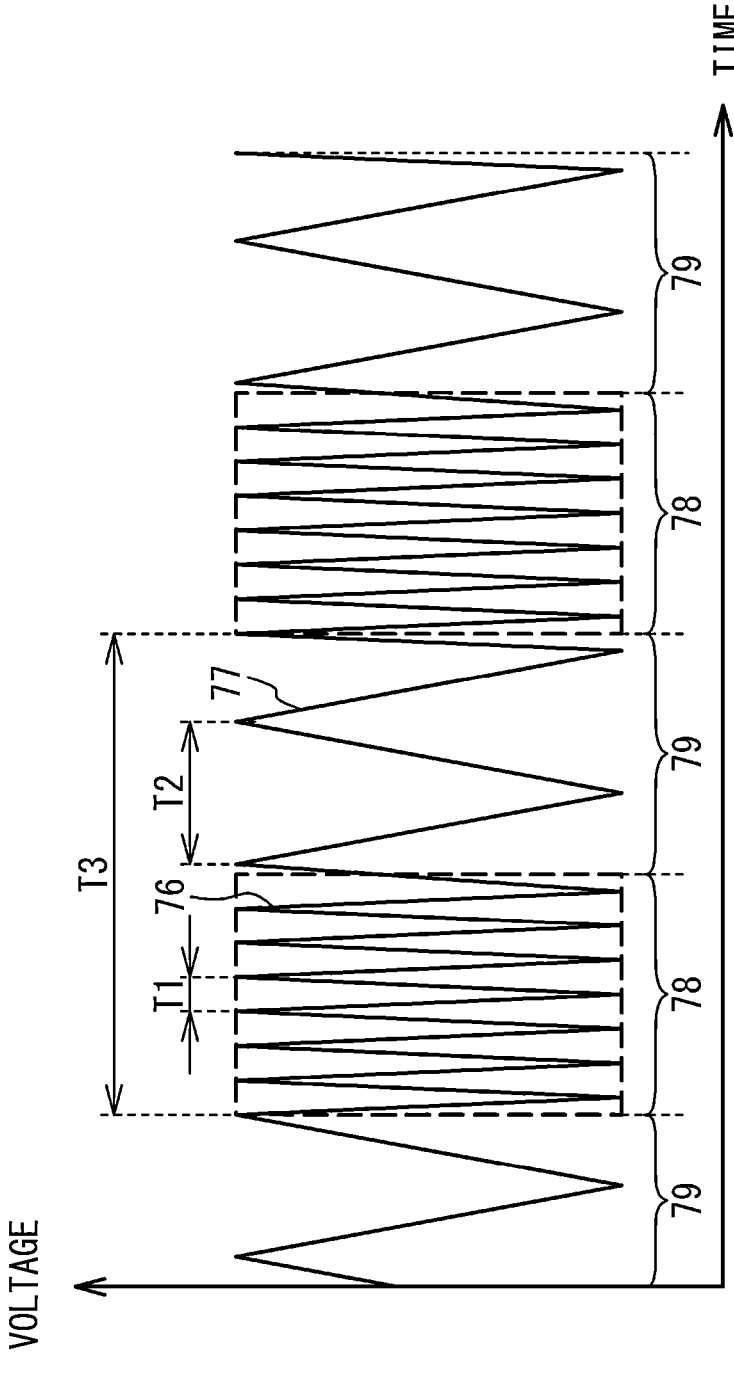
FIG. 4 illustrates signals supplied to the piezoelectric element by a driving device in the first embodiment.

FIG. 4 illustrates signals supplied to the piezoelectric element by the driving device in the first embodiment. In FIG. 4, the horizontal axis represents time, and the vertical axis represents voltage. The driving device 52 alternately switches a period 78 during which a signal 76 is supplied and a period 79 during which a signal 77 is supplied. The switching cycle (frequency) is a period T3 (frequency f3). The signal 76 has a period T1 (frequency f1). The signal 77 has a period T2 (frequency f2). The signals 76 and 77 are often sine waves, but are illustrated as triangular waves in FIG. 4. The signals 76 and 77 may be either sine, triangular or sawtooth waves.

The frequencies mainly used are as follows.

Resonant frequency of the housing 50: 10 kHz or higher and 100 kHz or lower

Frequency to which Pacinian corpuscles are sensitive: 100 Hz or higher and 400 Hz or lower Frequency to which Meissner's corpuscles are sensitive: 10 Hz or higher and 250 Hz or lower Frequency to which Merkel's discs are sensitive: 1 Hz or higher and 100 Hz or lower The following two modes are mainly used.

Low Frequency Modulation Mode

Frequency f1: Frequency to which Pacinian corpuscles are sensitive

Frequency f2: Frequency to which Meissner's corpuscles are sensitive

Frequency f3: Frequency to which Merkel's discs are sensitive

High-Frequency Modulation Mode

Frequency f1: Resonant frequency of the housing 50

Frequency f2: Frequency to which Pacinian corpuscles are sensitive

Frequency f3: Frequency to which Meissner's corpuscles or Merkel's discs are sensitive Experiment The tactile sensation was investigated by gripping the member 11b of the housing 50 as if holding a pen. The materials of the members used in the experiment are as follows.

Piezoelectric elements 10a and 10b

Material of the piezoelectric body 80: PZT

Material of the first electrode 82 and the second electrode 84: Silver-palladium Widths in the X direction and the Y direction: 3.5 mm Height in the Z direction: 3 mm Number of the stacked piezoelectric layers 81 in the first section 86: 50

Number of the first sections 86:3

Material of the support member 12: Stainless

Materials of the members 11a and 11b: Acrylic resin

Resonant frequency of the housing 50: 30 kHz

Signals 76 and 77: Sine wave

Ratio of the periods 78 and 79: 1:1

Experiment of Low Frequency Modulation Mode

Table 1 presents the conditions when the frequency f1 is 250 Hz. Here, f1/f2 and f2/f3 indicate the ratio of frequencies, and f1−f2 and f2−f3 indicate the difference between frequencies. In the item "Favorability", "A" is put for the condition that achieves a stronger tactile sensation.

6

TABLE 1

| Condition | f1 [Hz] | f2 [Hz] | f3 [Hz] | f1/f2 | f2/f3 | f1 − f2 [Hz] | f2 − f3 [Hz] | Favor-ability |
|---|---|---|---|---|---|---|---|---|
| A1 | 250 | 100 | 3 | 2.5 | 33.3 | 150 | 97 | |
| A2 | 250 | 100 | 13 | 2.5 | 7.7 | 150 | 87 | |
| A3 | 250 | 100 | 63 | 2.5 | 1.6 | 150 | 37 | |
| A4 | 250 | 60 | 3 | 4.2 | 20.0 | 190 | 57 | A |
| A5 | 250 | 60 | 13 | 4.2 | 4.6 | 190 | 47 | |
| A6 | 250 | 60 | 63 | 4.2 | 1.0 | 190 | −3 | |
| A7 | 250 | 30 | 3 | 8.3 | 10.0 | 220 | 27 | A |
| A8 | 250 | 30 | 13 | 8.3 | 2.3 | 220 | 17 | |
| A9 | 250 | 30 | 63 | 8.3 | 0.5 | 220 | −33 | |
| A10 | 250 | 60 | 25 | 4.2 | 2.4 | 190 | 35 | A |
| A11 | 250 | 30 | 25 | 1.2 | 1.2 | 220 | 5 | A |

In Table 1, the frequency f1 was set at 250 Hz. When the frequency f2 was set at 100 Hz, in the condition A1 where the frequency f3 was set at 3 Hz, the vibration is effectively braked, and a fine and zingy floating feeling was obtained. In the condition A2 where the frequency f3 was set at 13 Hz, the vibration was accelerated, and a bouncy pumping tactile sensation was obtained. In the condition A3 where the frequency f3 was set at 63 Hz, the tactile sensation that gives heavy pressure and low impact of vibration close to high frequency driving was obtained. In this manner, the change in the frequency f3 produces a tactile sensation corresponding to the frequency f3.

When the frequency f2 was set at 60 Hz, in the condition A4 where the frequency f3 was 3 Hz, the braking was more effective than in the condition A1, and the tactile sensation of stopping a brush with a jerky motion was obtained. The condition A4 is optimal for the brush-stopping tactile sensation. In the condition A5 where the frequency f3 was 13 Hz, the brush-stopping tactile sensation was obtained more than in the condition A2, and a sharp tactile sensation was obtained. In the condition A where the frequency f3 was 63 Hz, the tactile sensation was the same as that in the condition A3. When the frequency f2 was 30 Hz, the tactile sensation where the brush is stopped by heavy pressure was obtained under the condition A7 where the frequency f3 was 3 Hz. In the condition A8 where the frequency f3 was 13 Hz, a hazy tactile sensation was produced. In the condition A9 where the frequency f3 was 63 Hz, the tactile sensation was weaker than in the conditions A3 and A6, and the feeling of numbness was felt as a whole. Under the conditions A10 and A11 where the frequency f2 was set to 60 Hz and 30 Hz and the frequency f3 was set to 25 Hz, respectively, a strong tactile sensation was obtained.

In the case where the frequency f1 is 250 Hz, the tactile sensation tends to be strong when the frequency f2 is 60 Hz or 30 Hz. When the frequency f3 is 63 Hz, the sensation is heavy, and the tactile sensation like breaking caused by switching of the signals 76 and 77 is not obtained much. When the frequency f3 is 25 Hz or lower, different tactile sensations can be obtained depending on the frequency f3 by changing the frequency f2.

Table 2 lists the conditions when the frequency f1 is 330 Hz.

TABLE 2

| Condition | f1 [Hz] | f2 [Hz] | f3 [Hz] | f1/f2 | f2/f3 | f1 − f2 [Hz] | f2 − f3 [Hz] | Favor-ability |
|---|---|---|---|---|---|---|---|---|
| B1 | 330 | 100 | 3 | 3.3 | 33.3 | 230 | 97 | |
| B2 | 330 | 100 | 13 | 3.3 | 7.7 | 230 | 87 | A |
| B3 | 330 | 100 | 63 | 3.3 | 1.6 | 230 | 37 | |
| B4 | 330 | 60 | 3 | 5.5 | 20.0 | 270 | 57 | A |

TABLE 2-continued

| Condition | f1 [Hz] | f2 [Hz] | f3 [Hz] | f1/f2 | f2/f3 | f1 – f2 [Hz] | f2 – f3 [Hz] | Favor-ability |
|---|---|---|---|---|---|---|---|---|
| B5 | 330 | 60 | 13 | 5.5 | 4.6 | 270 | 47 | |
| B6 | 330 | 60 | 63 | 5.5 | 1.0 | 270 | –3 | |
| B7 | 330 | 30 | 3 | 11.0 | 10.0 | 300 | 27 | |
| B8 | 330 | 30 | 13 | 11.0 | 2.3 | 300 | 17 | |
| B9 | 330 | 30 | 63 | 11.0 | 0.5 | 300 | –33 | |

In Table 2, the frequency f1 was set to 330 Hz. When the frequency f2 was set to 100 Hz, the condition B1 where the frequency f3 was set to 3 Hz was more suitable for the tactile sensation of brush stopping because the tactile sensation of brush stopping is stronger than in the condition A1. The condition B2 where the frequency f3 was set to 13 Hz was suitable for the high-frequency tactile sensation with low impact. In the condition B3 where the frequency f3 was set to 63 Hz, the tactile sensation was close to the high-frequency driving. When the frequency f2 was set to 60 Hz, the condition B4, where the frequency f3 was set to 3 Hz, produced a stronger tactile sensation of brush stopping than the condition B1, and was most suitable for the tactile sensation of brush stopping among the conditions with a frequency f1 of 330 Hz. The tactile sensation was weaker under the conditions B5 and B6 where the frequencies f3 were 13 Hz and 63 Hz, respectively, than under the conditions B2 and B3. The tactile sensation was weaker under the conditions B7 to B9 where the frequency f2 was set to 30 Hz, than under the conditions B4 to B6.

In the case that the frequency f1 is 330 Hz, the tactile sensation is weak when the frequency f2 is 30 Hz. In the case that the frequency f3 is 3 Hz, the tactile sensation is strongest in the condition B4 where the frequency f2 is 60 Hz. In the case that the frequency f3 is 13 Hz, the tactile sensation is strongest in the condition B2 where the frequency f2 is 100 Hz.

Table 3 lists the conditions when the frequency f1 is 190 Hz.

TABLE 3

| Condition | f1 [Hz] | f2 [Hz] | f3 [Hz] | f1/f2 | f2/f3 | f1 – f2 [Hz] | f2 – f3 [Hz] | Favor-ability |
|---|---|---|---|---|---|---|---|---|
| C1 | 190 | 100 | 3 | 1.9 | 33.3 | 90 | 97 | A |
| C2 | 190 | 100 | 13 | 1.9 | 7.7 | 90 | 87 | |
| C3 | 190 | 100 | 63 | 1.9 | 1.6 | 90 | 37 | |
| C4 | 190 | 60 | 3 | 3.2 | 20.0 | 130 | 57 | |
| C5 | 190 | 60 | 13 | 3.2 | 4.6 | 130 | 47 | |
| C6 | 190 | 60 | 63 | 3.2 | 1.0 | 130 | –3 | |
| C7 | 190 | 30 | 3 | 6.3 | 10.0 | 160 | 27 | |
| C8 | 190 | 30 | 13 | 6.3 | 2.3 | 160 | 17 | |
| C9 | 190 | 30 | 63 | 6.3 | 0.5 | 160 | –33 | |

In Table 3, the frequency f1 was set to 190 Hz. When the frequency f1 is set to 190 Hz, the tactile sensation is generally weak. In the condition C1 where the frequency f2 was set to 100 Hz and the frequency f3 was set to 3 Hz, the user felt braking with a weighty sensation. This is suitable for application to reproduce a rough paper quality. In other conditions C1 to C9, the tactile sensation tended to be weaker than those in the conditions A1 to A9 and the conditions B1 to B9.

Table 4 lists the conditions when the frequency f1 is 330 Hz.

TABLE 4

| Condition | f1 [Hz] | f2 [Hz] | f3 [Hz] | f1/f2 | f2/f3 | f1 – f2 [Hz] | f2 – f3 [Hz] | Favor-ability |
|---|---|---|---|---|---|---|---|---|
| D1 | 330 | 200 | 3 | 1.7 | 66.7 | 130 | 197 | A |
| D2 | 330 | 200 | 13 | 1.7 | 15.4 | 130 | 187 | A |
| D3 | 330 | 200 | 63 | 1.7 | 3.2 | 130 | 137 | |
| D4 | 330 | 110 | 3 | 3.0 | 36.7 | 220 | 107 | A |
| D5 | 330 | 110 | 13 | 3.0 | 8.5 | 220 | 97 | |
| D6 | 330 | 110 | 63 | 3.0 | 1.7 | 220 | 47 | |
| D7 | 330 | 10 | 3 | 33.0 | 3.3 | 320 | 7 | A |
| D8 | 330 | 10 | 13 | 33.0 | 0.8 | 320 | –3 | |
| D9 | 330 | 10 | 63 | 33.0 | 0.2 | 320 | –53 | |

In Table 4, the frequency f1 was set to 330 Hz, and the frequency f2 was set to 200 Hz, 110 Hz, and 10 Hz different from those in Table 2. In the conditions D1, D4, and D7 where the frequency f3 was 3 Hz, a strong tactile sensation was obtained. In the condition D7, a tactile sensation close to the heart sound and different from those in the conditions D1 and D4 was obtained. When the frequency f3 was 13 Hz, a strong tactile sensation was obtained under the condition D2 where the frequency f2 was 200 Hz.

In summary, in the case that the frequency f3 is 3 Hz, a strong tactile sensation with effective braking is obtained at a frequency f2 between 10 Hz and 200 Hz when the frequency f1 is 330 Hz. Even when the frequency f1 is 190 Hz or 250 Hz, if the frequency f2 is set to 60 Hz or 100 Hz, a faster-tempo and stronger tactile sensation is obtained than when the frequency f1 is 3 Hz. When the frequency f3 is 63 Hz, the tactile sensation with effective braking is not strong.

In addition, experiments F1 to F8 were conducted. Table 5 lists the conditions for the experiments F1 to F8.

TABLE 5

| Experiment | f1 [Hz] | f2 [Hz] | f3 [Hz] |
|---|---|---|---|
| F1 | 250 | 30, 60, 110 | 13 |
| F2 | 250 | 30 | 1, 3, 6, 8 |
| F3 | 330 | 20, 30, 60, 100 | 8 |
| F4 | 330 | 30 | 1, 3, 6, 8 |
| F5 | 330 | 20, 30, 100, 200, 250 | 3 |
| F6 | 330 | 250 | 1, 3, 8 |
| F7 | 190 | 50 | 1, 3, 6, 8 |
| F8 | 190 | 15 | 6 |

First, in the experiment F1 in Table 5, the frequencies f1 and f3 were set to 250 Hz and 13 Hz, respectively, and the frequency f2 was set to 30 Hz, 60 Hz, and 110 Hz. A frequency f2 of 110 Hz makes it difficult to obtain a tactile sensation of the frequency f2. When the frequency f2 was set to 60 Hz, the tactile sensation of the frequency f2 was obtained, and when the frequency f2 was set to 30 Hz, the tactile sensation of the frequency f2 was obtained more than when the frequency f2 was set to 60 Hz.

In the experiment F2, the frequencies f1 and f2 were set to 250 Hz and 30 Hz, respectively, and the frequency f3 was set to 1 Hz, 3 Hz, 6 Hz, and 8 Hz. At a frequency f3 of 1 Hz, an interval between periods during which a strong tactile sensation was felt was long. At a frequency f3 of 3 Hz, the interval between periods during which a strong tactile sensation was felt was appropriate. At a frequency f3 of 6 Hz, there was no interval between periods during which a strong tactile sensation was felt. At a frequency f3 of 8 Hz, a stronger tactile sensation was obtained than when the frequency f3 was 6 Hz, while there was no interval between periods during which a strong tactile sensation was felt.

In the experiment F3, the frequencies f1 and f3 were set to 330 Hz and 8 Hz, respectively, and the frequency f2 was set to 20 Hz, 30 Hz, 60 Hz, and 100 Hz. In the experiment F3, unlike the experiment F1, the difference in tactile sensation due to the frequency f2 was hardly felt.

In the experiment F4, the frequencies f1 and f2 were set to 330 Hz and 30 Hz, respectively, and the frequency f3 was set to 1 Hz, 3 Hz, 6 Hz, and 8 Hz. When the frequency f3 was changed, the tactile sensation changed in the same manner as when the frequency f1 was 250 Hz. The trend was the same as in the experiment F2.

In the experiment F5, the frequencies f1 and f3 were set to 330 Hz and 3 Hz, respectively, and the frequency f2 was set to 20 Hz, 30 Hz, 100 Hz, 200 Hz, and 250 Hz. The tactile sensation was hardly changed at a frequency f2 of 20 Hz to 100 Hz, as in the experiment F3. When the frequency f2 was 200 Hz or 250 Hz, the vibration was fine, and the tactile sensation of the frequency f3 was hardly felt.

In the experiment F6, the frequencies f1 and f2 were set to 330 Hz and 250 Hz, respectively, and the frequency f3 was wet to 1 Hz, 3 Hz, and 8 Hz. The tactile sensation of the frequency f3 was not felt, and the tactile sensation was hardly changed even when the frequency f3 was varied.

In the experiment F7, the frequencies f1 and f2 were set to 190 Hz and 50 Hz, respectively, and the frequency f3 was set to 1 Hz, 3 Hz, 6 Hz, and 8 Hz. The tactile sensation of the frequency f3 was obtained, but the tactile sensation was weak compared to those in the experiments F2 and F4.

In the experiment F8, the frequencies f1, f2 and f3 were set to 190 Hz, 15 Hz, and 6 Hz, respectively. The tactile sensation of the frequency f3 was obtained, but the tactile sensation was weak as compared to those in the experiments F2 and F4, as in the experiment F7.

In summary, a frequency f1 of 250 Hz or 330 Hz provides a greater tactile sensation than a frequency f1 of 190 Hz. When the frequency f2 is 200 Hz or higher, it is difficult to obtain the tactile sensation of the period of the frequency f3. A frequency f3 of 3 Hz to 8 Hz provides a tactile sensation corresponding to the period of the frequency f3.

As described above, the driving device 52 switches between the period 78 (first period) during which the signal 76 (first signal) having the frequency f1 (first frequency) is supplied to the vibrator 55 and the period 79 (second period) during which the signal 77 (second signal) having the frequency f2 (second frequency) is supplied to the vibrator 55. In this case, the frequency f1 is set to be equal to or higher than 100 Hz and equal to or lower than 400 Hz, which are frequencies to which Pacinian corpuscles are sensitive. The frequency f2 is set to be lower than the frequency f1 and to be equal to or higher than 10 Hz and equal to or lower than 250 Hz, which are frequencies at which Meissner's corpuscles are sensitive. The frequency f3 (third frequency) at which the periods 78 and 79 are switched is set to be equal to or higher than 1 Hz and equal to or lower than 100 Hz, which are frequencies at which Merkel's discs are sensitive. This can provide the skin with a strong tactile sensation close to that in the high-frequency modulation mode. Since the frequencies f1 and f2 are lower than those in the high-frequency modulation mode, the power consumption can be reduced as compared with that in the high-frequency modulation mode.

As presented in Tables 1 to 5, a frequency f1 of 250 Hz and a frequency f1 of 330 Hz can strengthen the tactile sensation. Therefore, the frequency f1 is preferably 150 Hz or higher, more preferably 200 Hz or higher, and preferably 350 Hz or lower. As presented in Tables 1 to 5, the tactile sensation can be increased at a frequency f2 of 30 Hz, 60 Hz, 100 Hz, and 200 Hz. Therefore, the frequency f2 is preferably 10 Hz or higher, more preferably 20 Hz or higher, and preferably 250 Hz or lower, more preferably 200 Hz or lower, and further preferably 100 Hz or lower. As presented in Tables 1 to 5, the tactile sensation can be increased at a frequency f3 of 3 Hz, 6 Hz, 8 Hz, 13 Hz, and 25 Hz. Therefore, the frequency f3 is preferably 2 Hz or higher, preferably 30 Hz or lower, more preferably 25 Hz or lower, and further preferably 10 Hz or lower.

As presented in Tables 1 to 4, when the difference f1-f2 between the frequencies f1 and f2 and the difference f2-f3 between the frequencies f2 and f3 are large, the tactile sensation tends to be large. Therefore, the difference f1-f2 is preferably 50 Hz or higher, and more preferably 100 Hz or higher. The difference f2-f3 is preferably 5 Hz or higher, and more preferably 10 Hz or higher.

As presented in Tables 1 to 4, when the ratio f1/f2 between the frequencies f1 and f2 and the ratio f2/f3 between the frequencies f2 and f3 are large, the tactile sensation tends to be large. Therefore, the ratio f1/f2 is preferably 1.5 or greater, and more preferably 2 or greater. The ratio f2/f3 is preferably 1 or greater, and more preferably 5 or greater.

Experiment of High Frequency Modulation Mode

Table 6 lists the conditions when the frequency f1 is 30 KHz.

TABLE 6

| Condition | f1 [Hz] | f2 [Hz] | f3 [Hz] |
|-----------|---------|---------|---------|
| E1 | 30000 | 250 | 3 |
| E2 | 30000 | 250 | 14 |
| E3 | 30000 | 250 | 60 |

As presented in Table 6, in the high-frequency modulation mode, the frequency f1 was set to 30 kHz, which is the resonant frequency of the housing 50, and the frequency f2 was set to 250 Hz, which is a frequency to which Pacinian corpuscles are sensitive. In the condition E1 where the frequency f1 was 3 Hz, the feeling that the pen pulsating at 3 Hz steps on the brake was produced, and the tactile sensation that the pen stops intermittently was provided. In the condition E2 where the frequency f1 was 14 Hz, a fine pumping tactile sensation and a clicky bouncing tactile sensation were obtained. In the condition E3 where the frequency f1 was 60 Hz, a forceful pressure sensation, which is a tactile sensation with heavy pressure, was provided. As described above, different tactile sensations can be obtained by changing the frequency f3. By setting the frequency f1 to the resonant frequency of the vibrator 55, a strong tactile sensation can be obtained on the skin.

According to the knowledge of the inventors, the frequency f1 may be in a range of 0.86 times or more and 1.14 times or less of the resonant frequency of the vibrator 55, and preferably a range of 0.9 times or more and 1.1 times or less of the resonant frequency of the vibrator 55. The resonant frequency may be the resonant frequency in a fundamental mode or the resonant frequency in a harmonic mode. The frequency f1 is, for example, 10 kHz or higher and 100 kHz or lower, or 20 kHz or higher and 70 kHz or lower.

The frequency f2 is the frequency to which Pacinian corpuscles are sensitive, and is 100 Hz or higher and 400 Hz or lower. The frequency f2 is preferably 150 Hz or higher, more preferably 200 Hz or higher, and preferably 350 Hz or lower. The frequency f3 is the frequency to which Meissner's corpuscles and Merkel's discs are sensitive, and is lower than the frequency f2, and is 1 Hz or higher and 100 Hz or lower. The frequency f2 is preferably 2 Hz or higher and 60 Hz or lower.

The voltage amplitude of the signal 76 during the period 78 and the voltage amplitude of the signal 77 during the period 79 are substantially equal to each other, for example. The voltage amplitude of the signal 76 during the period 78 may be different from that of the signal 77 during the period 79. However, the voltage amplitude of the signal 76 during the period 78 is preferably equal to or greater than 1/2 times and equal to or less than 2 times that of the signal 77 during the period 79, more preferably equal to or greater than 3/4 times and equal to or less than 4/3 times that of the signal 77 during the period 79, and further preferably equal to or greater than 9/10 times and equal to or less than 10/9 times that of the signal 77 during the period 79. The length of the period 78 and the length of the period 79 are substantially equal to each other, for example. If the period 78 or 79 is too short, it is difficult to obtain the tactile sensation by the frequency f3. From this viewpoint, the length of the period 78 is preferably equal to or greater than 1/2 times and equal to or less than 2 times the length of the period 79, more preferably equal to or greater than 3/4 times and equal to or less than 4/3 times the length of the period 79, and further preferably equal to or greater than 9/10 times and equal to or less than 10/9 times the length of the period 79.

In the first embodiment, the vibrator 55 includes the piezoelectric elements 10a and 10b of the longitudinally displaceable mode and the housing 50. The housing 50 includes the members 11a (first member) and 11b (second member) that sandwich the piezoelectric elements 10a and 10b in the Z direction, and the members 11a and 11b press the piezoelectric elements 10a and 10b in the Z direction. This configuration can improve the Q factor of the mechanical vibration. Therefore, the tactile sensation can be increased.

Second Embodiment

Figure 5:
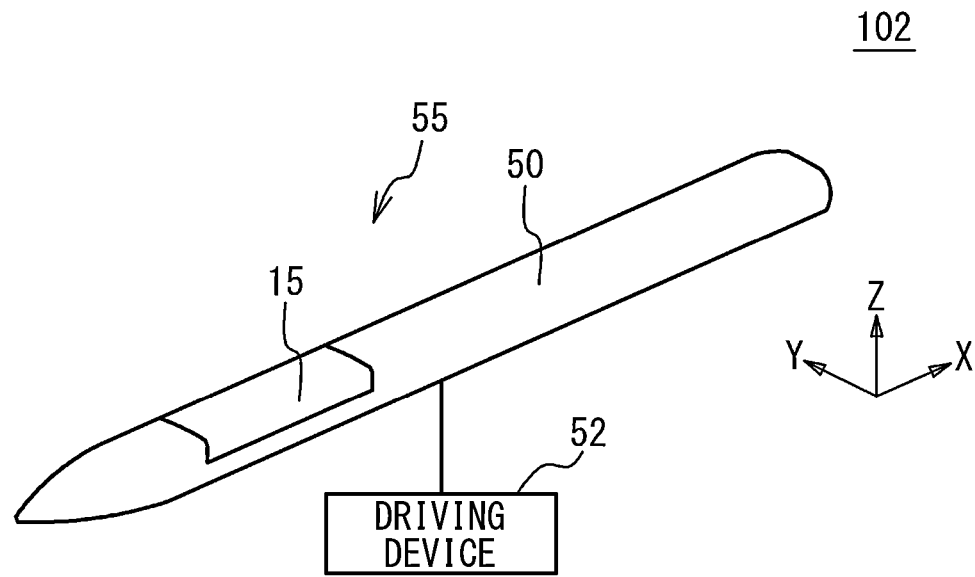
FIG. 5 is a perspective view of a vibration generating device in accordance with a second embodiment.

As a second embodiment, a vibration generating device using a piezoelectric element of a lateral displacement mode (or a d31 mode) and having a pen-type housing will be described. FIG. 5 is a perspective view of the vibration generating device according to the second embodiment. FIG. 6A is a plan view of the vibration generating device in accordance with the second embodiment, and FIG. 6B to FIG. 6D are cross-sectional views taken along lines A-A, B-B, and C-C, respectively, in FIG. 6A. A direction in which a long side of a piezoelectric element 10 extends is defined as an X direction, a direction in which a short side of the piezoelectric element 10 extends is defined as a Y direction, and a direction orthogonal to the X direction and the Y direction is defined as a Z direction.

As illustrated in FIG. 5 to FIG. 6D, in a vibration generating device 102 of the second embodiment, the housing 50 is rod-shaped and flat. The tip in the −X direction is pointed. A narrow portion 17 is provided at the tip of the housing 50 in the X direction. The upper surface of the narrow portion 17 is provided with a recess portion 16 recessed in the −Z direction. The piezoelectric element 10 is provided on the upper surface of the narrow portion 17 and on the bottom surface of the recess portion 16. The piezoelectric element 10 is a piezoelectric element of a lateral displacement mode, and has a rectangular planar shape. The long side direction and the short side direction of the rectangle are the X direction and the Y direction, respectively. The piezoelectric element 10 is directly bonded to the bottom surface of the recess portion 16 on the upper surface of the narrow portion 17 using an adhesive. When the piezoelectric element 10 expands and contracts in the X direction, the narrow portion 17 vibrates so as to bend in the Z direction. A lid portion 15 is fitted over the narrow portion 17. The lid portion 15 protects the piezoelectric element 10 and the like. The material of the housing 50 and the lid portion 15 is, for example, metal or resin. The dimensions of the housing 50 in the X direction, the Y direction, and the Z direction are 138 mm, 12 mm, and 6.5 mm, for example. The material, shape, and dimensions of the housing 50 can be designed as appropriate.

Figure 7:
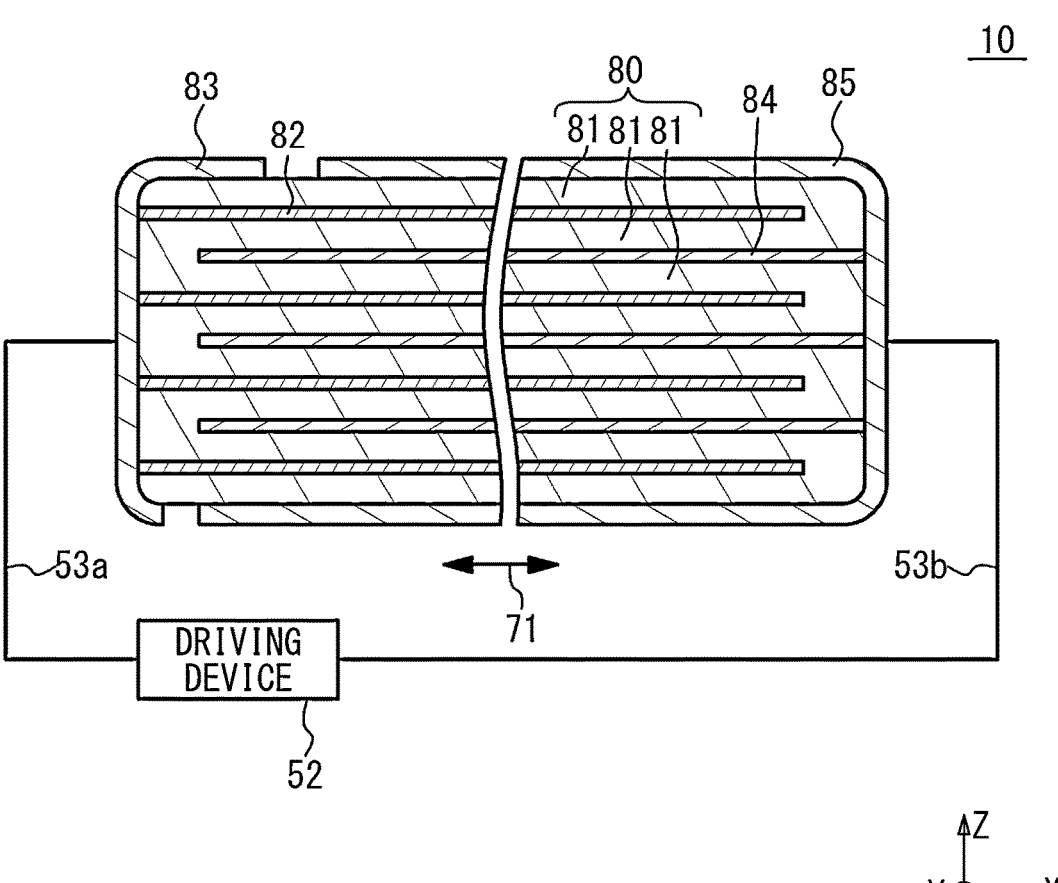
FIG. 7 is a cross-sectional view of the piezoelectric element in the second embodiment.

FIG. 7 is a cross-sectional view of a piezoelectric element in the second embodiment. As illustrated in FIG. 7, the number of the piezoelectric layers 81 in the piezoelectric element 10 of a lateral displacement mode is less than those in the piezoelectric elements 10a and 10b of a longitudinal displacement mode illustrated in FIG. 3. The number of the piezoelectric layers 81 is, for example, eight. The external electrode 83 is provided to wrap around the upper surface (the surface at the +Z side) of the piezoelectric body 80. The external electrode 85 is provided to wrap around the upper surface (+Z-side surface) and the lower surface (−Z-side surface) of the piezoelectric body 80. The external electrode 85 on the upper surface of the piezoelectric body 80 and the first electrode 82 of the uppermost layer are provided with the piezoelectric layer 81 of the uppermost layer interposed therebetween, and the external electrode 85 on the lower surface of the piezoelectric body 80 and the first electrode 82 of the lowermost layer are provided with the piezoelectric layer 81 of the lowermost layer interposed therebetween. The cables 53a and 53b electrically connected to the external electrodes 83 and 85, respectively, are electrically connected to the driving device 52. The material, and the like of the piezoelectric element 10 are the same as those of the first embodiment, and the description thereof is omitted.

The planar shape of the piezoelectric element 10 is a rectangle having the X direction as the long-side direction as illustrated in FIG. 6A. In the piezoelectric element 10 of a lateral displacement mode, the first electrode 82 and the second electrode 84 sandwich the piezoelectric layer 81 in the Z direction (first direction), and a voltage is supplied between the first electrode 82 and the second electrode 84, whereby the piezoelectric element 10 expands and contracts in the X direction (second direction orthogonal to the first direction) as indicated by an arrow 71.

As illustrated in FIG. 5, it is difficult to accommodate the piezoelectric elements 10a and 10b of a longitudinal displacement mode in the rod-shaped housing 50 having a smaller dimension in the Z direction than in the Y direction (the third direction orthogonal to the first direction and the second direction). This is because the piezoelectric elements 10a and 10b have a large number of stacked layers and are thicker. Therefore, the piezoelectric element 10 of a lateral displacement mode is used. However, in the piezoelectric element 10 of a lateral displacement mode, it is difficult to vibrate the housing 50. Therefore, the housing 50 is provided with the narrow portion 17 whose width in the Z direction is narrowed in the center portion in the X direction. The piezoelectric element 10 is mounted on the narrow portion 17. Thus, the narrow portion 17 is easily bent in the Z direction because the width in the Z direction is narrow. By mounting the piezoelectric element 10 on the narrow portion 17, the housing 50 can be bent and vibrated.

As in the second embodiment, even in the stylus pen using the piezoelectric element 10 of a lateral displacement mode, the same tactile sensation as that of the first embodiment can be given to the hand of the user.

Third Embodiment

Figure 8:
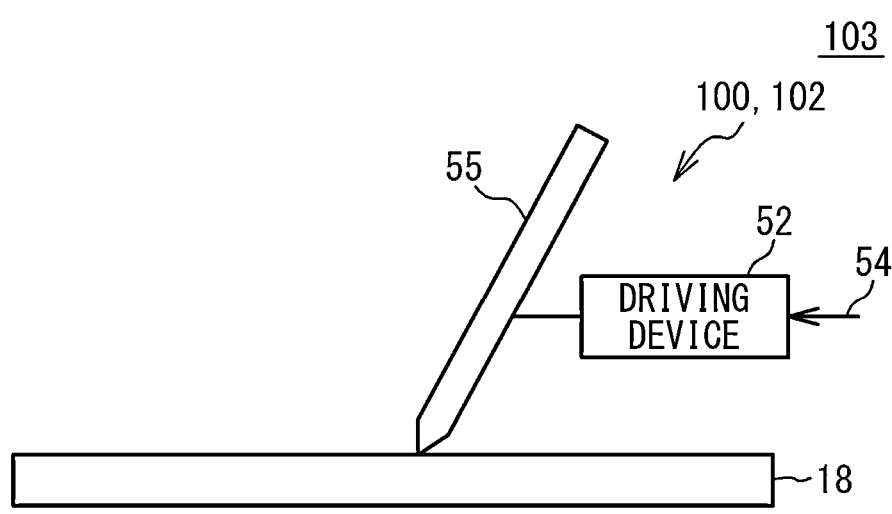
FIG. 8 illustrates a system in accordance with a third embodiment.

FIG. 8 illustrates a system in accordance with a third embodiment. As illustrated in FIG. 8, a system 103 of the third embodiment includes the vibration generating device 100 or 102 of the first or second embodiment and a panel 18. The panel 18 is, for example, a display panel. The user brings the tip of the vibrator 55 into contact with the panel 18. The driving device 52 supplies signals as illustrated in FIG. 4 to the piezoelectric elements 10a and 10b or 10 in the vibrator 55. The driving device 52 changes the frequencies f1 to f3 of the signal supplied to the vibrator 55 based on an input switching signal 54. Thus, the user can obtain various tactile sensations. For example, when the user moves the vibrator 55 with the tip of the vibrator 55 in contact with the panel 18, the user can obtain a tactile sensation of paper quality such as rough paper or slippery paper. The user can also obtain tactile sensations of operating the brush, such as moving the brush and stopping the brush. Further, for example, in the case that a line is displayed on the panel 18 when the tip of the vibrator 55 moves on the upper surface of the panel 18, it is possible to give a user different vibrations with different tactile sensations depending on the color of the displayed line.

In the third embodiment, the driving device 52 switches at least one of the frequencies f1 to f3 based on the switching signal 54. This allows the user to obtain different tactile sensations. In particular, the driving device 52 switches the frequency f3 and does not switch the frequencies f1 and f2 based on the switching signal 54. As described above, by switching only the frequency f3 based on the switching signal 54, the driving device 52 can be simplified, and by switching the frequency f3, the user can obtain different tactile sensations.

As in the first to third embodiments, the housing 50 is formed in a pen shape. This can provide the user with a tactile sensation of paper quality or brush stopping.

Fourth Embodiment

Figure 9:
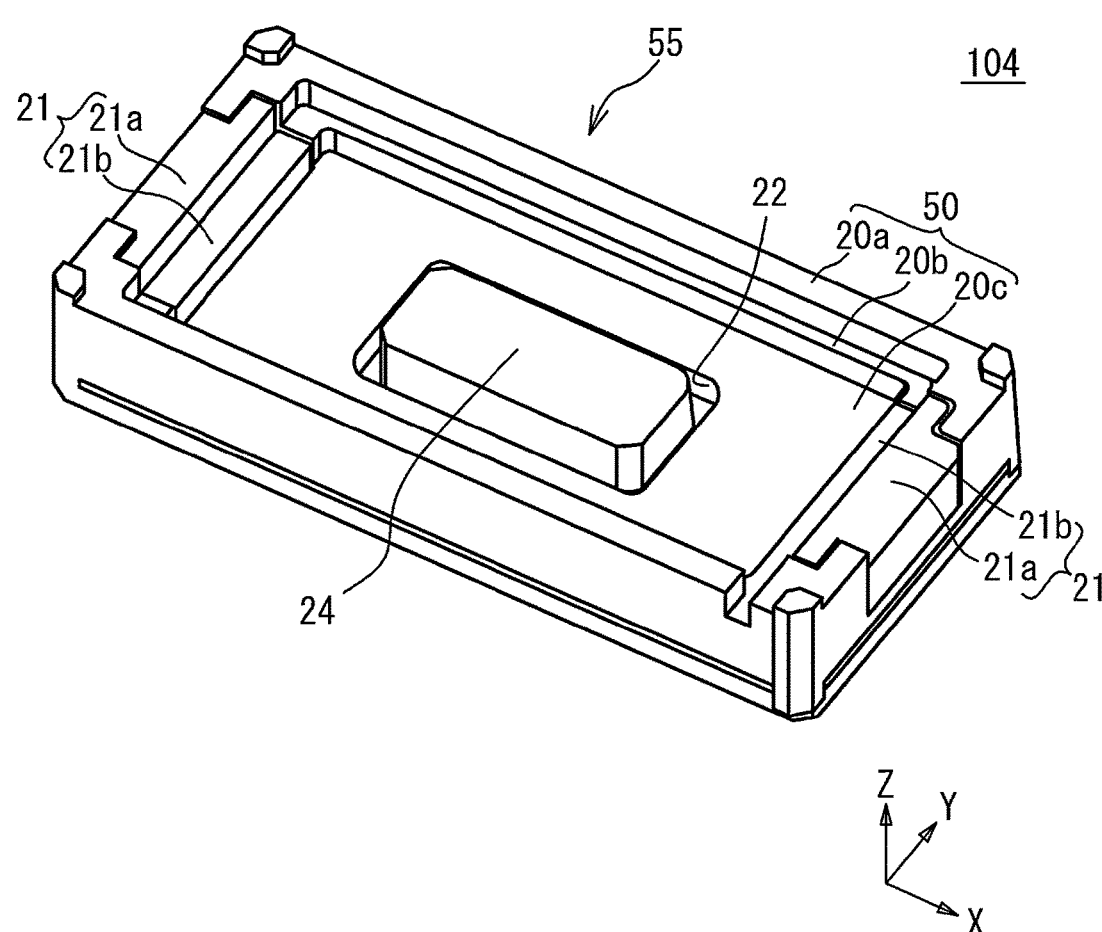
FIG. 9 is a perspective view of a vibration generating device in accordance with a fourth embodiment.
Figure 10:
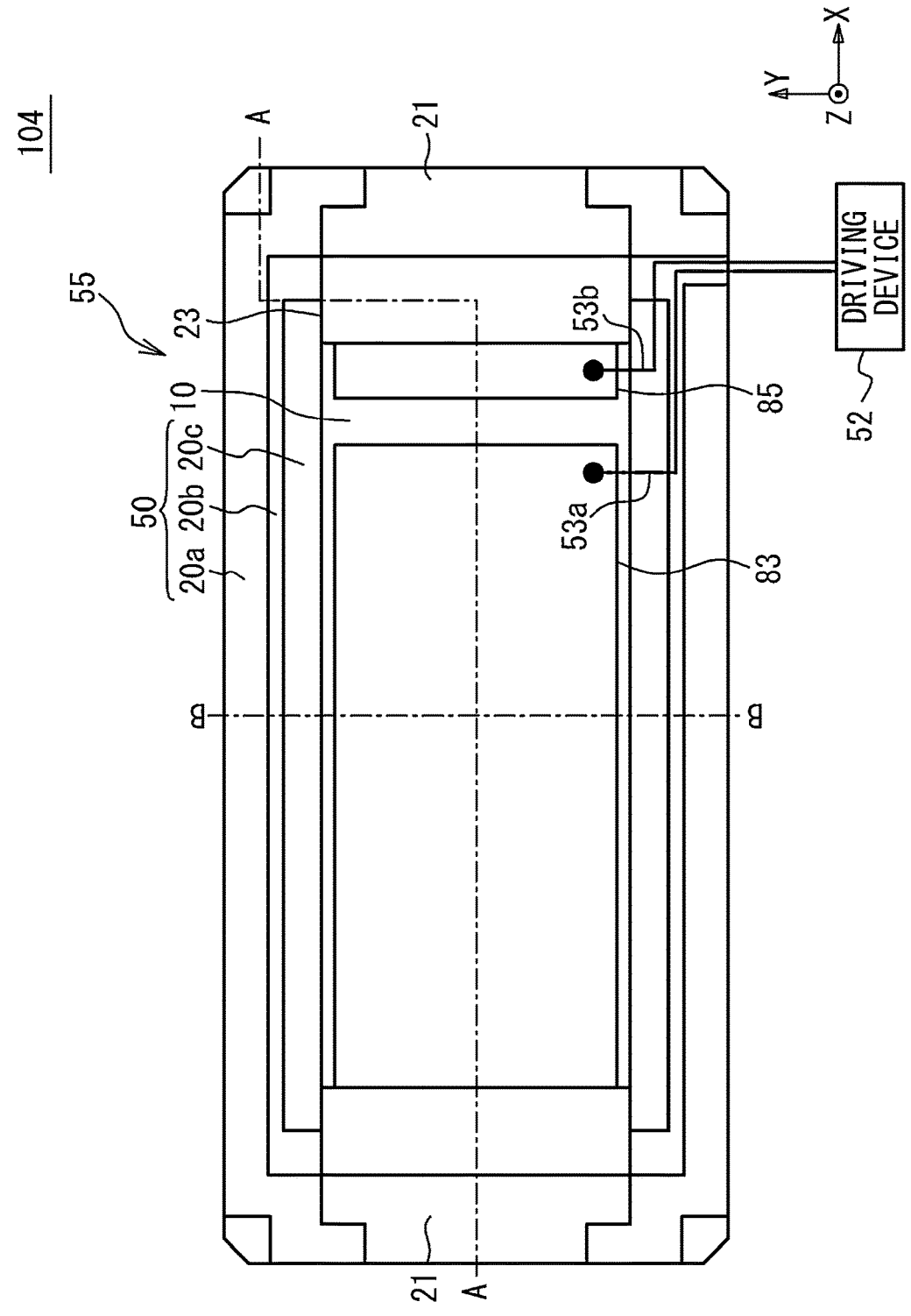
FIG. 10 is a plan view of the vibration generating device in accordance with the fourth embodiment.
Figures 11A, 11B:
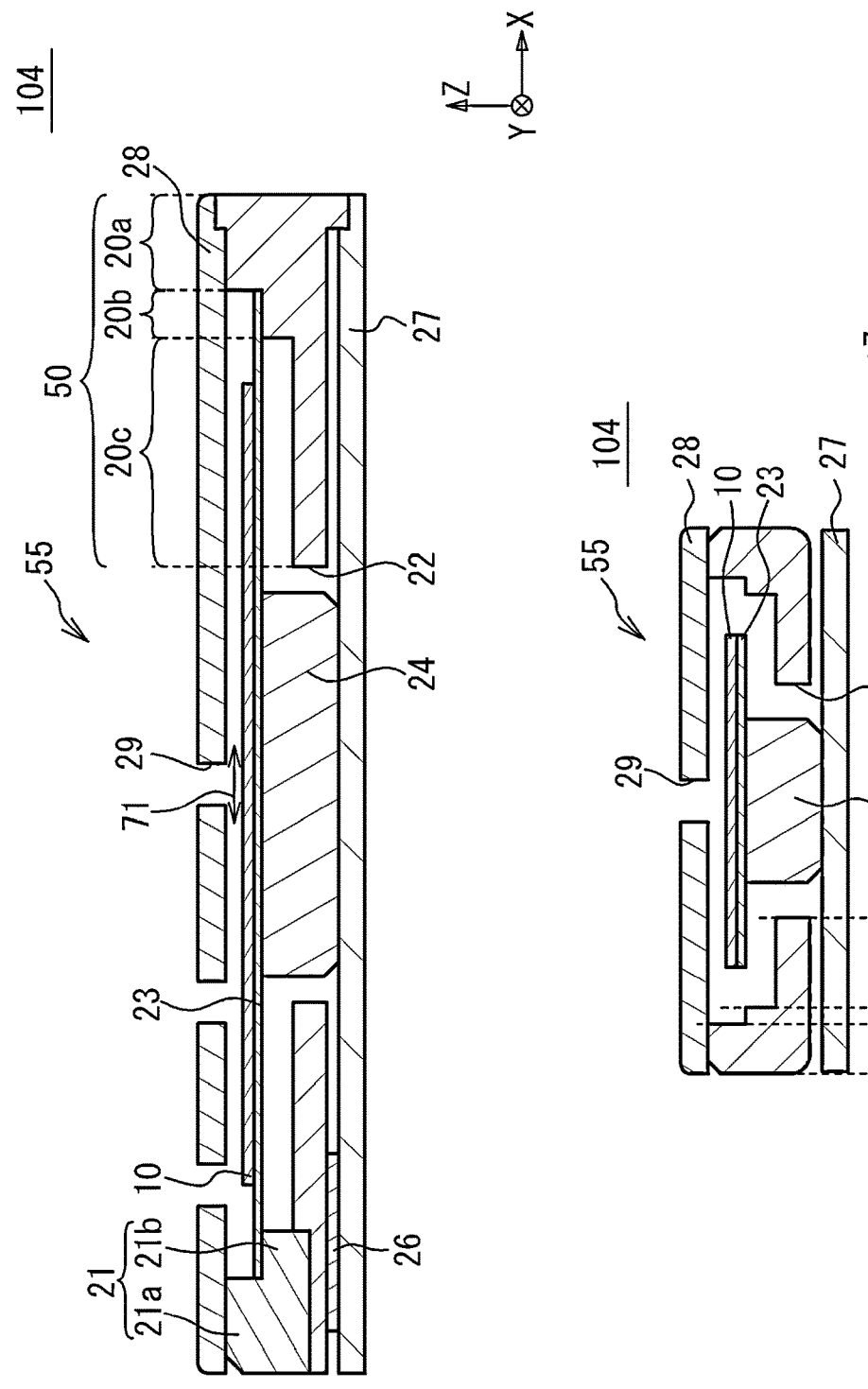
FIG. 11A and FIG. 11B are cross-sectional views taken along lines A-A and B-B in FIG. 10, respectively.

A fourth embodiment is an example of a vibration generating device using a minitaturizable vibrator that uses a piezoelectric element of a lateral displacement mode. FIG. 9 is a perspective view of the vibration generating device in accordance with the fourth embodiment. FIG. 10 is a plan view of the vibration generating device in accordance with the fourth embodiment. FIG. 11A and FIG. 11B are cross-sectional views taken along lines A-A and B-B in FIG. 10, respectively. FIG. 9 is a perspective view of the vibration generating device in which the plate member 28, a vibrating plate 23, and the piezoelectric element 10 are removed. FIG. 10 is a plan view of the vibration generating device with the plate member 28 removed as viewed from above. A direction in which a long side of the piezoelectric element 10 extends is defined as the X direction, a direction in which a short side of the piezoelectric element 10 extends is defined as the Y direction, and a direction orthogonal to the X direction and the Y direction is defined as the Z direction.

As illustrated in FIG. 9 to FIG. 11B, in a vibration generating device 104 of the fourth embodiment, the planar shape of the housing 50 is a rectangle whose long sides and short sides extend in the X direction and the Y direction, respectively. Plate members 27 and 28 are provided on the lower surface and the upper surface of the housing 50, respectively.

The housing 50 includes a frame body 20a, a step portion 20b, and a lower wall portion 20c. The step portion 20b is provided inside the frame body 20a. The lower wall portion 20c is provided inside the step portion 20b. An opening 22 is provided in the center of the lower wall portion 20c. The planar shapes of the frame body 20a, the step portion 20b, the lower wall portion 20c, and the opening 22 are rectangles whose long sides and short sides extend in the X direction and the Y direction, respectively. Fixing members 21 are attached to both sides of the housing 50 in the X direction. The material of the fixing member 21 is harder than the material of the housing 50. The fixing member 21 has an L-shaped cross section and includes a main body portion 21a and a step portion 21b. The height of the upper surface (+Z-side surface) of the main body portion 21a and the height of the upper surface (+Z-side surface) of the frame body 20a are substantially the same. The height of the upper surface of the step portion 21b is substantially the same as the height of the upper surface of the step portion 20b. A hole that connects the inside and the outside of the housing 50 is provided on the +X side of the sidewall at the −Y side of the frame body 20a.

The piezoelectric element 10 is fixed to a center portion of the upper surface (+Z-side surface) of the vibrating plate 23 by an adhesive or the like. The piezoelectric element 10 is, for example, the piezoelectric element illustrated in FIG. 7. The planar shapes of the vibrating plate 23 and the piezoelectric element 10 are rectangles whose long sides and short sides extend in the X direction and the Y direction, respectively. The width of the vibrating plate 23 in the Y direction is substantially the same as the width of the piezoelectric element 10 in the Y direction. A weight 24 is fixed to the center portion of the lower surface (−Z-side surface) of the vibrating plate 23 by an adhesive or the like. The weight 24 is accommodated in the opening 22 of the lower wall portion 20c, and the lower surface of the weight 24 is positioned below the lower surface of the lower wall portion 20c. The weight 24 is not joined to the housing 50. The weight 24 has a rectangular planar shape.

Both end portions of the vibrating plate 23 in the X direction are fixed to the upper surface of the step portion 21b of the fixing member 21 by an adhesive or the like. The main body portion 21a is located outside the vibrating plate 23 in the X direction. The main body portion 21a can restrict the vibrating plate 23 from moving in the X direction. In a plan view, the piezoelectric element 10 does not overlap the step portion 21b. The cables 53a and 53b electrically connected to the external electrodes 85 and 83 of the piezoelectric element 10, respectively, are drawn out to the outside of the housing 50 through a hole provided in the frame body 20a, and are electrically connected to the driving device 52. The configuration of the piezoelectric element 10 is the same as that in FIG. 4.

The plate member 27 is fixed to the lower surface of the housing 50. Recesses are provided at four corners of the upper surface of the plate member 27. The four corners of the lower surface of the housing 50 are provided with protrusions. The protrusion is fitted into the recess. A bonding material 26 bonds the housing 50 and the plate member 27. The lower surface of the weight 24 and the upper surface of the plate member 27 are not joined or fixed. The lower surface of the weight 24 and the upper surface of the plate member 27 may be separated from each other. The distance between the lower surface of the weight 24 and the lower surface of the plate member 27 is preferably set to such a distance that the lower surface of the weight 24 comes into contact with the upper surface of the plate member 27 when the vibrating plate 23 vibrates.

The plate member 28 is fixed to the upper surface of the housing 50. Recesses are provided at four corners of the lower surface of the plate member 28. The four corners of the upper surface of the housing 50 are provided with protrusions. The protrusion is fitted into the recess. The housing 50 and the plate member 28 are joined to each other using an adhesive or the like. The plate member 28 is provided with a hole 29 penetrating through the plate member 28 in the Z direction. The hole 29 functions as a sound emitting hole for emitting sound waves in the housing 50 to the outside. The materials of the housing 50 and the plate members 27 and 28 are, for example, resin or metal. The material of the fixing member 21 has a Young's modulus larger than that of the housing 50. The dimensions of the housing 50 in the X direction, the Y direction, and the Z direction are 26 mm, 12 mm, and 3 mm, respectively, for example. The thicknesses of the plate members 27 and 28 are, for example, 0.8 mm. The materials, shapes, and dimensions of the housing 50 and the plate members 27 and 28 can be appropriately designed.

In the fourth embodiment, the housing 50 has the frame body 20a surrounding the piezoelectric element 10 of a lateral displacement mode and the vibrating plate 23 as viewed from the Z direction, fixes the vibrating plate 23 at both ends of the vibrating plate 23 in the X direction, and sets both ends of the vibrating plate 23 in the Y direction as free ends. Thus, when the piezoelectric element 10 expands and contracts as indicated by the arrow 71 in FIG. 11A, the vibrating plate 23 vibrates in the Z direction. In this manner, an inertial drive system can be implemented. Since the piezoelectric element 10 of a lateral displacement mode is bonded to the vibrating plate 23, the total thickness of the housing 50 and the plate members 27 and 28 can be reduced. Therefore, a thin vibration generating device can be realized. In addition, the number of the piezoelectric layers 81 of the piezoelectric element 10 of a lateral displacement mode can be reduced, and the capacitance can be reduced. This can reduce power consumption when the vibration generating device drives at high frequencies. In one example, power consumption can be reduced compared to a vibration generating device that presses a piezoelectric element of a longitudinal displacement mode from a vibration direction.

By providing the plate members 27 and 28, the Q factor of mechanical vibration can be increased. Further, by providing the weight 24, a high output can be achieved by an inertia effect.

In the fourth embodiment, the vibration generating device 104 can be made thin. Therefore, the vibration generating device 104 can be attached to the earlobe or the concha cavity. Further, by placing the vibration generating device 104 on the back side of the outer ear, the vibration generating device 104 can be used as an earphone using bone conduction. Further, by providing the vibration generating device 104 of the fourth embodiment to the fingertip of a glove or the band of a wristwatch, it is possible to give a tactile sensation to the fingertip or the arm. Further, the vibration generating device 104 can be installed in a hair ornament, a hair clip, or the like to provide a tactile sensation to the head. The driving device 52 supplies the signals as illustrated in FIG. 4 to the vibrator 55, and the frequencies f1 to f3 are appropriately set, whereby various tactile sensations can be given to the user.

Fifth Embodiment

Figure 12:
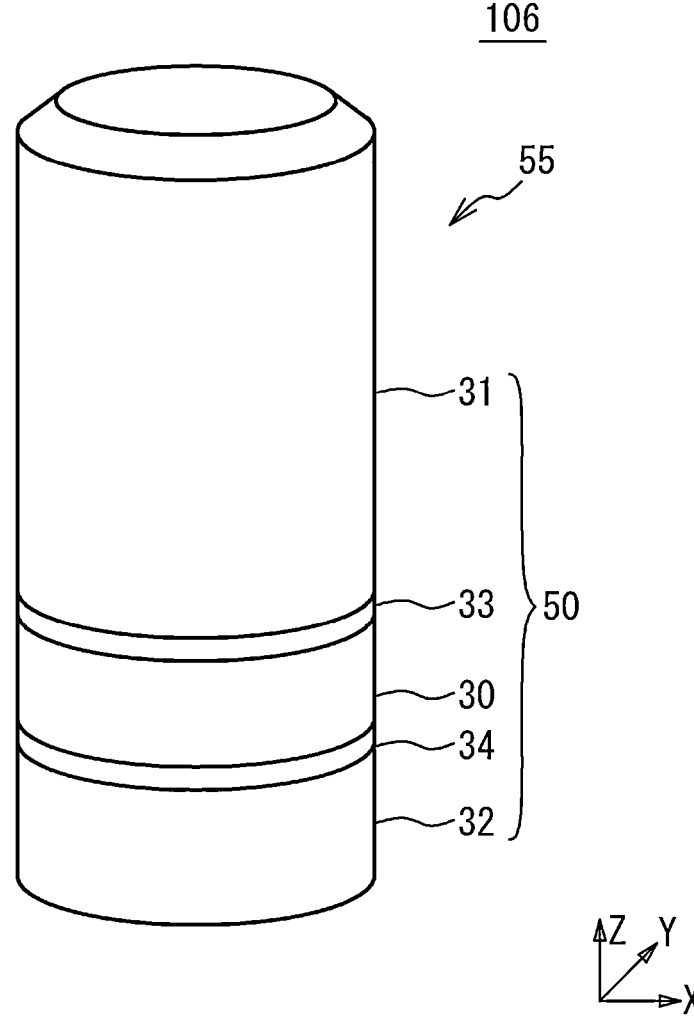
FIG. 12 is a perspective view of a vibration generating device in accordance with a fifth embodiment.
Figure 13:
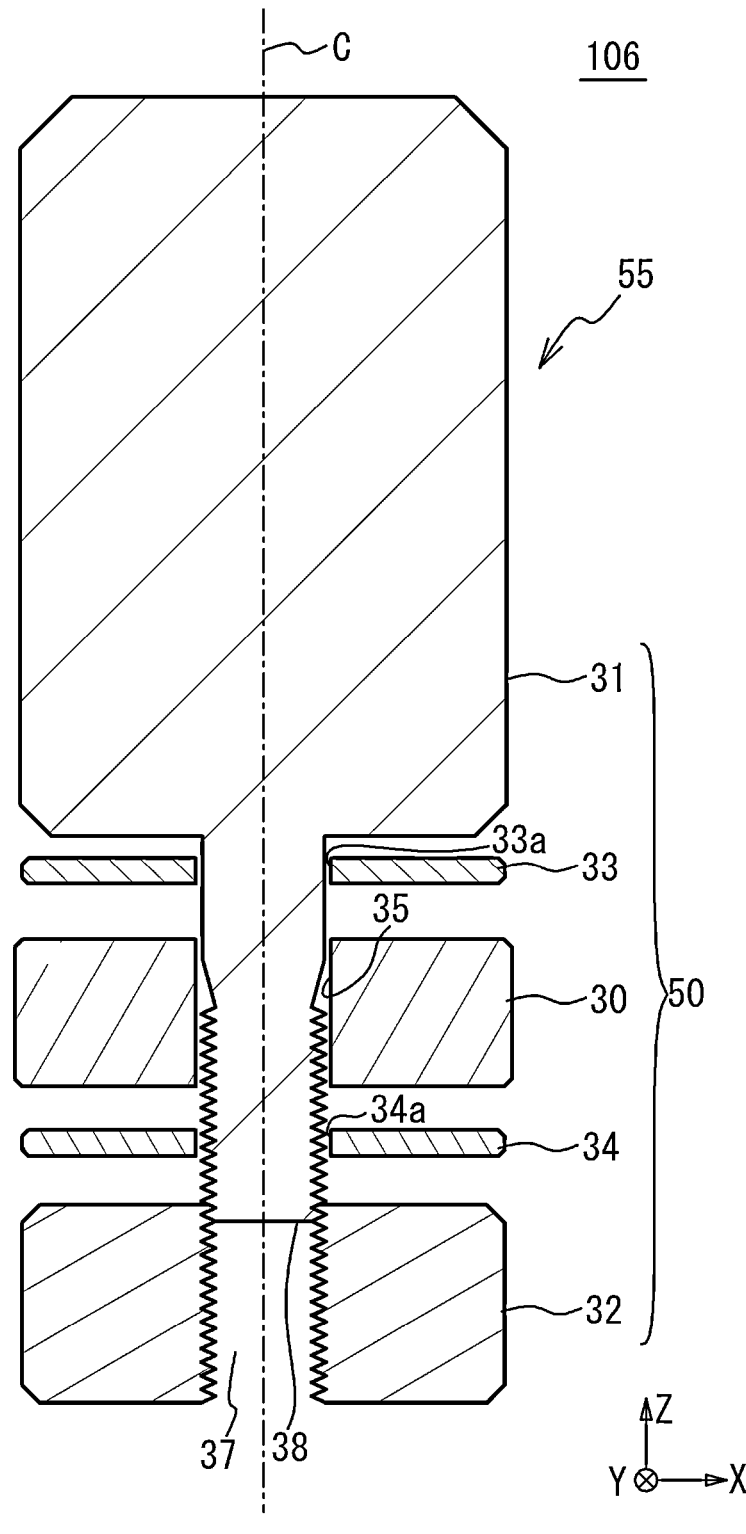
FIG. 13 is a cross-sectional view of the vibration generating device in accordance with the fifth embodiment.

A fifth embodiment is an example in which piezoelectric elements of a longitudinal displacement mode are provided in parallel to enable higher output. FIG. 12 is a perspective view of a vibration generating device according to the fifth embodiment. FIG. 13 is a cross-sectional view of the vibration generating device according to the fifth embodiment. A direction in which a member 31 and a member 32 sandwich a member 30 is defined as a Z direction, and directions orthogonal to the Z direction are defined as an X direction and a Y direction. C in FIG. 13 is the center line.

As illustrated in FIG. 12 and FIG. 13, in a vibration generating device 106 of the fifth embodiment, the housing 50 includes the members 30 to 32. A flat plate member 33 is provided between the members 30 and 31, and a flat plate member 34 is provided between the members 30 and 32. A rod-shaped protrusion 38 protruding in the −Z direction is provided on the −Z-side surface of the member 31. The member 32 is provided with a hole 37 into which the tip of the protrusion 38 is fitted. A screw thread serving as a male screw is provided at the tip of the protrusion 38, and a screw thread serving as a female screw is provided on the inner surface of the hole 37. The members 31 and 32 are joined by fitting the threads.

The member 30 and the flat plate members 33 and 34 are provided with openings 35, 33a and 34a through which the protrusion 38 penetrates, respectively. The protrusion 38 is not joined to the member 30 or the flat plate members 33 and 34, and can freely move in the openings 35, 33a, and 34a. The planar shapes of the members 30 to 32 and the flat plate members 33 and 34 are circular, and the centers of the planar shapes substantially coincide with each other. The materials of the members 30 to 32 and the flat plate members 33 and 34 are, for example, resin or metal. The members 31 and 32 and the flat plate members 33 and 34 are preferably made of hard materials, for example, stainless steel or aluminum. The member 30 is a member for restricting the movement of the piezoelectric elements 10a and 10b, and therefore may be a soft material such as plastic. The diameters of the members 30 to 32 and the flat plate members 33 and 34 are 20 mm as an example. The dimensions of the members 30, 31, and 32 and the flat plate members 33 and 34 in the Z direction are 5.8 mm, 30 mm, 8 mm, 1 mm, and 1 mm, respectively, as an example. The materials, shapes, and dimensions of the members 30, 31, and 32 and the flat plate members 33 and 34 can be appropriately designed.

Figure 14A:
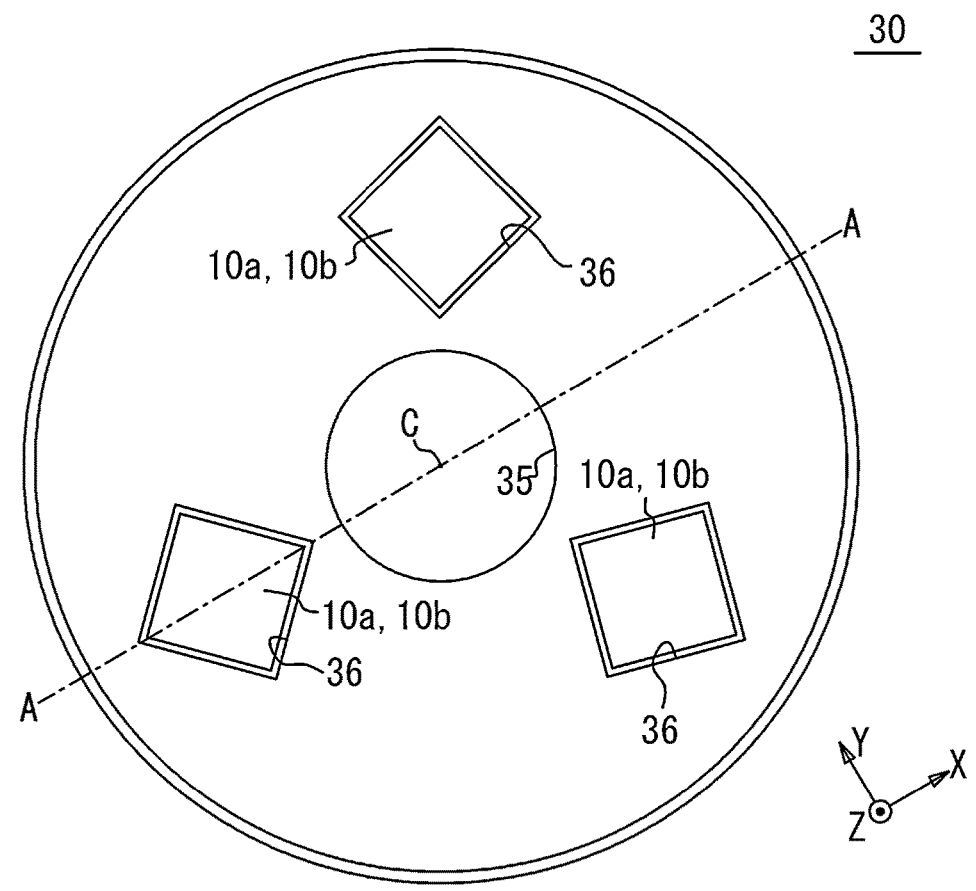
FIG. 14A is a plan view of a member 30 in the fifth embodiment.
Figure 14B:
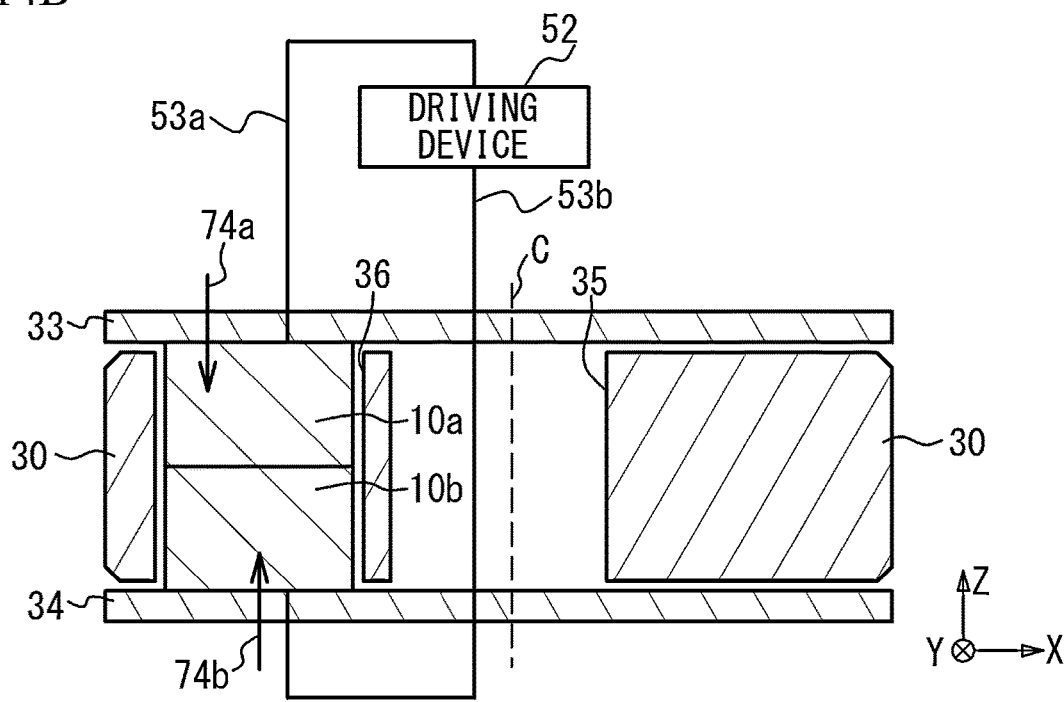
FIG. 14B is a cross-sectional view taken along line A-A in FIG. 14A.

FIG. 14A is a plan view of the member 30 according to the fifth embodiment, and FIG. 14B is a cross-sectional view taken along line A-A in FIG. 14A. FIG. 14B illustrates the flat plate members 33 and 34 in addition to the member 30. As illustrated in FIG. 14A and FIG. 14B, the planar shapes of the member 30 and the opening 35 are circular, and the centers of the circular shapes of the member 30 and the opening 35 substantially coincide with the center line C. The member 30 has an opening 36. The opening 36 has a substantially quadrangular planar shape. Three openings 36 are provided. Two piezoelectric elements 10a and 10b are provided in one opening 36. The piezoelectric elements 10a and 10b are, for example, the piezoelectric elements illustrated in FIG. 3, and are stacked in the Z direction. The piezoelectric elements 10a and 10b are not bonded to the opening 36 and can freely move in the opening 36.

The +Z-side surface of the piezoelectric element 10a protrudes from the +Z-side surface of the member 30 in the +Z direction, and the −Z-side surface of the piezoelectric element 10b protrudes from the −Z-side surface of the member 30 in the −Z direction. The +Z-side surface of the piezoelectric element 10a is in contact with the flat plate member 33, and the −Z-side surface of the piezoelectric element 10b is in contact with the flat plate member 34. In FIG. 12 and FIG. 13, the member 31 presses the piezoelectric element 10a in the −Z direction as indicated by an arrow 74a via the flat plate member 33 by tightening the screws between the protrusion 38 and the hole 37. The member 32 presses the piezoelectric element 10b in the +Z direction as indicated by an arrow 74b via the flat plate member 34.

In the fifth embodiment, the Q factor of the mechanical vibration of the housing 50 is improved by the housing 50 pressing the piezoelectric elements 10a and 10b of a longitudinal displacement mode. Therefore, even in a small-sized vibration generating device, higher output can be achieved. Further, the members 31 and 32 press a plurality of the piezoelectric elements 10a and 10b in parallel, thereby enabling a higher output. Although the example in which the two piezoelectric elements 10a and 10b are arranged in the Z direction in one opening 36 has been described, one piezoelectric element or three or more piezoelectric elements may be provided in one opening 36.

A support member having a larger Young modulus than the piezoelectric elements 10a and 10b may be provided between the piezoelectric element 10a and the flat plate member 33 and between the piezoelectric element 10b and the flat plate member 34.

The user can obtain a tactile sensation by gripping the housing 50 of the vibration generating device 106. For example, the vibration generating device 106 is installed on a handlebar of a bicycle, so that a rider of the bicycle can obtain information by vibration. The driving device 52 supplies the signals as illustrated in FIG. 4 to the vibrator 55, and the frequencies f1 to f3 are appropriately set, whereby various tactile sensations can be given to the user. For example, depending on the information given to the user, different tactile sensations can be given to the user.

Sixth Embodiment

Figure 15:
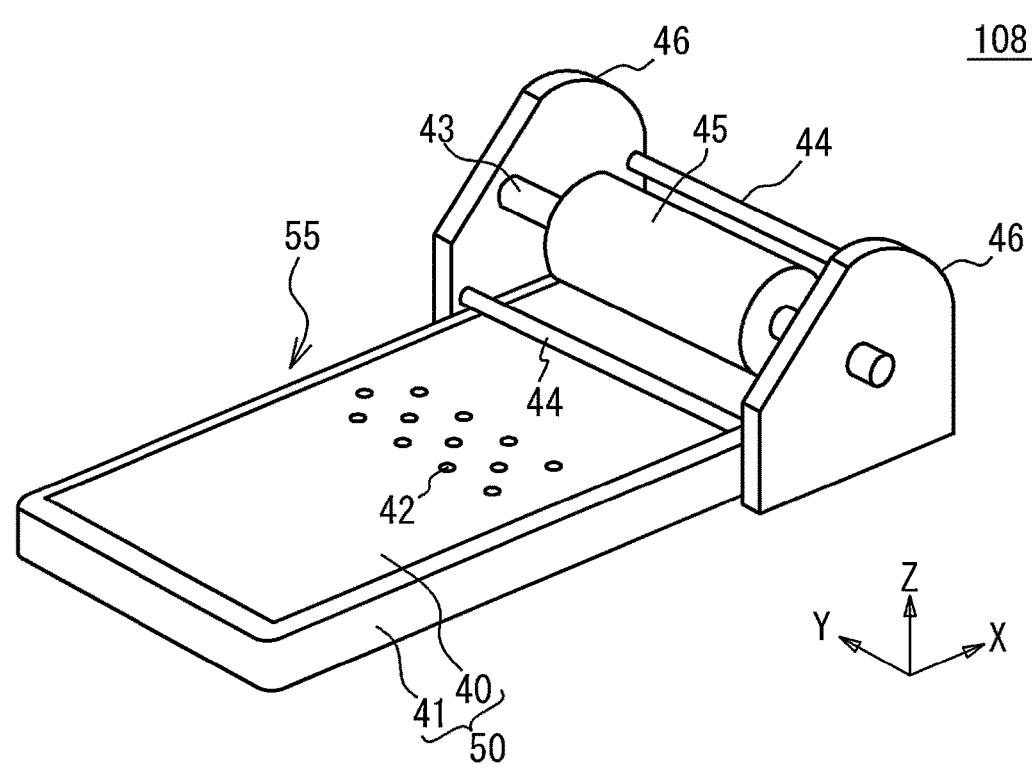
FIG. 15 is a perspective view of a film peeling device in accordance with a sixth embodiment.
Figure 16A:
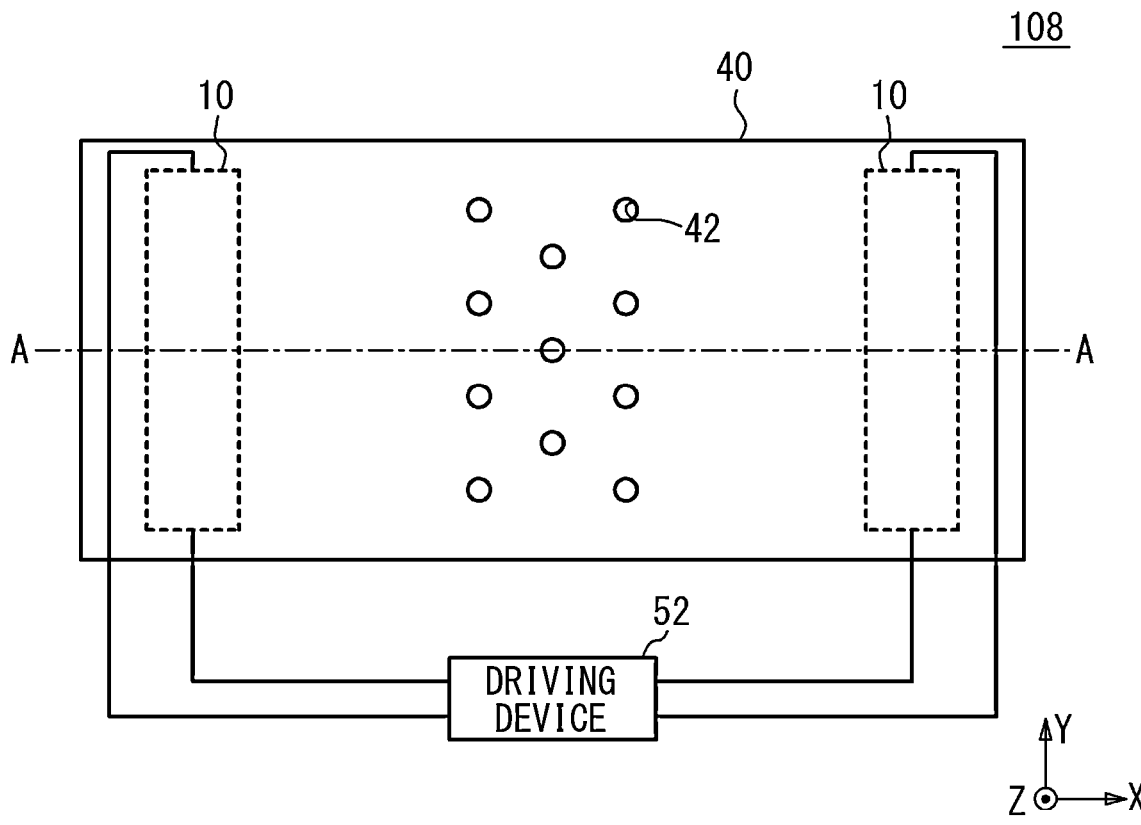
FIG. 16A is a plan view of a plate member in the sixth embodiment.
Figure 16B:
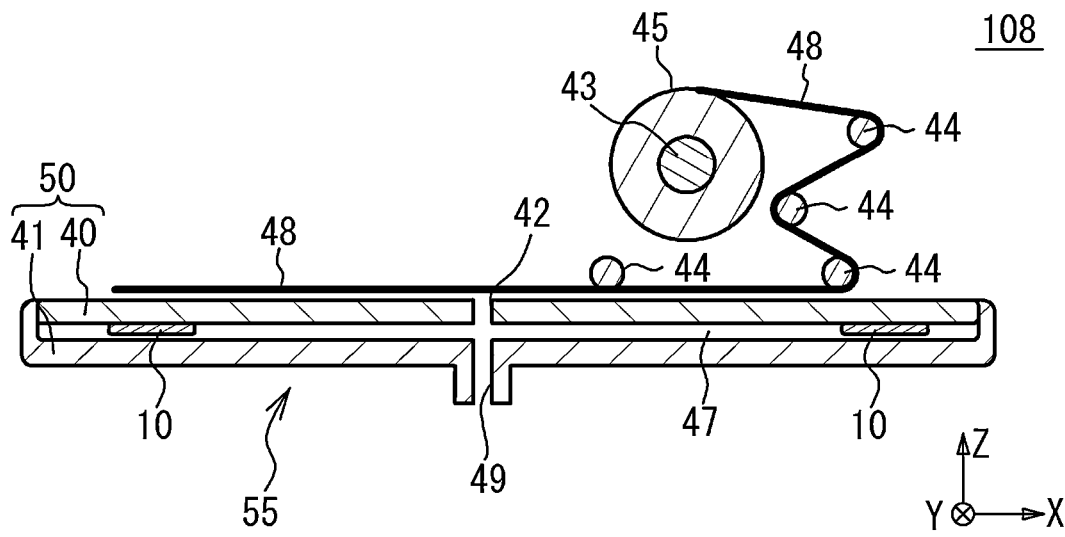
FIG. 16B is a cross-sectional view of the film peeling device corresponding to a cross-section taken along line A-A in FIG. 16A.

A sixth embodiment is an example of a film peeling device. FIG. 15 is a perspective view of a film peeling device according to the sixth embodiment. FIG. 16A is a plan view of a plate member in the sixth embodiment, and FIG. 16B is a cross-sectional view of the film peeling device corresponding to the cross section taken along line A-A in FIG. 16A. In the plate member 40, a direction in which a film 48 is pulled out is defined as a-X direction, a thickness direction of the plate member 40 is defined as a Z direction, and a direction orthogonal to the X direction and the Z direction is defined as a Y direction.

As illustrated in FIG. 15 to FIG. 16B, in a film peeling device 108 of the sixth embodiment, the housing 50 includes a plate member 40 and a member 41. The member 41 has a flat plate portion having a rectangular planar shape, and the peripheral edge portion of the flat plate portion is bent in the +Z direction. The bent portion surrounds the plate member 40 in the X direction and the Y direction and is provided in contact with the X-side and Y-side side walls of the plate member 40. A space 47 filled with a gas such as air is formed between the member 41 and the plate member 40. Side walls 46 extending in the +Z direction are fixed to both sides in the Y direction of an end portion in the +X direction of the housing 50. Between the two side walls 46, rollers 43 and 44 are provided. The roller 43 is a film roller, and a film roll 45 around which the film 48 is wound is installed. The rollers 44 are tension rollers, and applies tension to the film 48 when the film 48 is pulled out.

The plate member 40 is in the form of a flat plate, and has a rectangular planar shape. The upper surface (+Z-side surface) of the plate member 40 is substantially flat. A plurality of holes 42 penetrating through the plate member 40 are provided in the center portion of the plate member 40 in the X direction. The film 48 is vacuum-sucked by the holes 42. The piezoelectric element 10 is fixed to the lower surfaces (−Z-side surfaces) of both end portions of the plate member 40 in the X direction by an adhesive or the like. The piezoelectric element 10 is, for example, the piezoelectric element illustrated in FIG. 7, and is electrically connected to the driving device 52. A pump (not illustrated) sucks air in the space 47 through an exhaust path 49. The space 47 is negatively pressurized, and the holes 42 vacuum-suck and fix the film 48 on the plate member 40.

The film roll 45, around which the film 48 is wound, is attached to the roller 43. The film 48 is pulled from the film roll 45 onto the upper surface of the plate member 40 via the rollers 44. The drawn film 48 is fixed to the upper surface of the plate member 40 by suction of the holes 42.

Figure 17A:
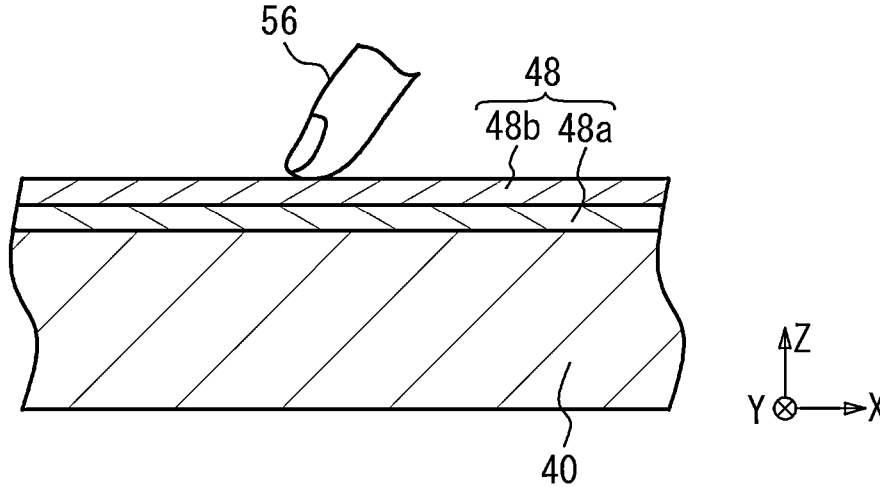
FIG. 17A and FIG. 17B are cross-sectional views of the plate member and a film in the sixth embodiment.
Figure 17B:
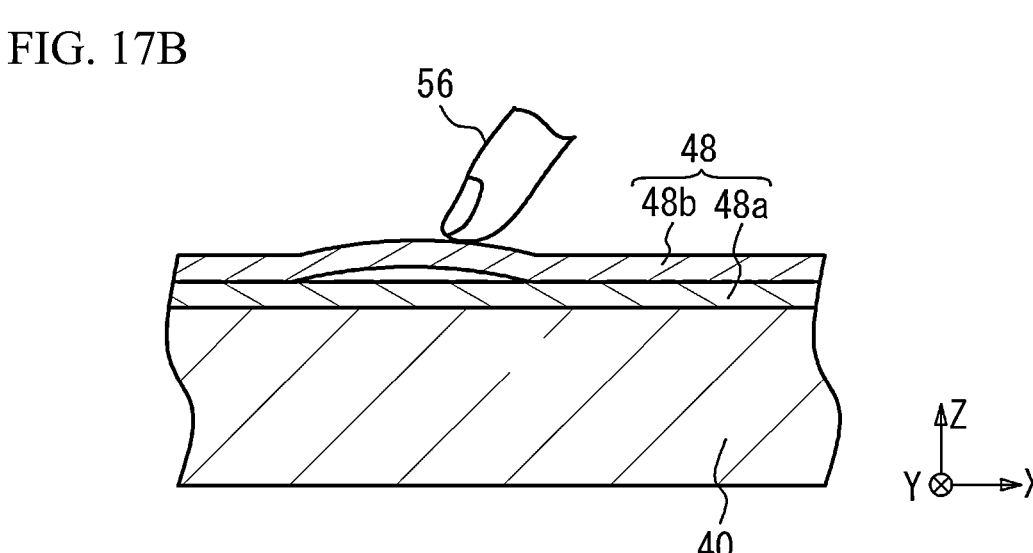

FIG. 17A and FIG. 17B are cross-sectional views of the plate member and the film according to the sixth embodiment. As illustrated in FIG. 17A, the film 48 is a multilayer film in which films 48a and 48b are stacked. The lower surface of the film 48a is fixed by, for example, vacuum suction. The user brings the tip of a finger 56 into contact with the upper surface of the film 48b. The driving device 52 supplies a signal to the piezoelectric element 10, and a standing wave of vibration is formed on the upper surface of the plate member 40. The vibration is transmitted to the finger 56. When the driving device 52 supplies the signals as illustrated in FIG. 4 to the piezoelectric element 10, a feeling like the tip of the finger 56 being trapped is obtained. By setting the signal frequencies f1 to f3 appropriately, the finger 56 can be more strongly trapped.

As illustrated in FIG. 17B, when the finger 56 is moved, the film 48b and the film 48a are shifted from each other, and the film 48b is peeled off from the film 48a. When the user grasps and pulls the film 48b with the fingers 56, the film 48b is peeled from the film 48a. The film 48 is, for example, bag-shaped, and a bag can be formed by peeling off the film 48a and the film 48b. The films 48a and 48b are, for example, plastic films or metallic films, and are, for example, polyethylene films.

The signal supplied by the driving device 52 can be used in a vibration generating device other than the first to sixth embodiments. For example, the piezoelectric elements 10 of a lateral displacement mode are provided at both sides of the flat plate, and the signals of FIG. 4 are supplied to the piezoelectric elements 10. This allows an object placed on the flat plate to be rotated or moved. By using a figure or the like as the object, the flat plate can be applied to a toy or a healing item.

In the first to sixth embodiments, the vibrator 55 includes a vibration element that is supplied with the signals 76 and 77 and vibrates in response to the signals 76 and 77, and the housing 50 to which the vibration element is fixed and which outputs the vibration of the vibration element. This can increase the tactile sensation. The piezoelectric elements 10, 10a, and 10b, which include the piezoelectric layer 81 and the first and second electrodes 82 and 84 sandwiching the piezoelectric layer 81 and in which the signals 76 and 77 are supplied between the first and second electrodes 82 and 84, have been described as examples of the vibration elements. The vibration element may be an element other than the piezoelectric element.

Although the embodiment of the present invention has been described in detail above, the present invention is not limited to the specific embodiment, and various modifications and changes can be made within the scope of the gist of the present invention described in the claims.

What is claimed is:

1. A vibration generating device comprising:

a vibrator; and a driving device configured to switch between a first period and a second period at a third frequency, the first period being a period during which a first signal having a first frequency of 100 Hz or higher and 400 Hz or lower is supplied to the vibrator, the second period being a period during which a second signal having a second frequency that is lower than the first frequency and is 10 Hz or higher and 250 Hz or lower is supplied to the vibrator, the third frequency being 1 Hz or higher and 100 Hz or less, wherein the vibrator includes:

a piezoelectric element including a piezoelectric layer, and a first electrode and a second electrode sandwiching the piezoelectric layer, the piezoelectric element expanding and contracting in a first direction in which the first electrode and the second electrode sandwich the piezoelectric layer when the first signal and the second signal are supplied between the first electrode and the second electrode; and a housing including a first member and a second member that sandwich the piezoelectric element in the first direction, the first member and the second member pressing the piezoelectric element in the first direction, and wherein the piezoelectric element is pressed in the first direction by the first member and the second member by fitting threads together which are provided on the first member and the second member, respectively.

2. The vibration generating device according to claim 1, wherein the first frequency is 200 Hz or higher and 350 Hz or lower, the second frequency is 10 Hz or higher and 200 Hz or lower, and the third frequency is 2 Hz or higher and 30 Hz or lower.

3. The vibration generating device according to claim 2, wherein a difference between the first frequency and the second frequency is 50 Hz or higher, and wherein a difference between the second frequency and the third frequency is 5 Hz or higher.

4. The vibration generating device according to claim 2, wherein the first frequency is equal to or greater than 1.5 times the second frequency, and wherein the second frequency is equal to or higher than 1 times the third frequency.

5. A vibration generating device comprising:

a vibrator; and a driving device configured to switch between a first period and a second period at a third frequency, the first period being a period during which a first signal having a first frequency that is equal to or greater than 0.86 times and equal to or less than 1.14 times a resonant frequency of the vibrator is supplied to the vibrator, the second period being a period during which a second signal having a second frequency that is lower than the first frequency and is 100 Hz or higher and 400 Hz or lower is supplied to the vibrator, the third frequency being lower than the second frequency and being 1 Hz or higher and 100 Hz or lower, wherein the vibrator includes:

a piezoelectric element including a piezoelectric layer, and a first electrode and a second electrode sandwiching the piezoelectric layer, the piezoelectric element expanding and contracting in a first direction in which the first electrode and the second electrode sandwich the piezoelectric layer when the first signal and the second signal are supplied between the first electrode and the second electrode; and a housing including a first member and a second member that sandwich the piezoelectric element in the first direction, the first member and the second member pressing the piezoelectric element in the first direction, and wherein the piezoelectric element is pressed in the first direction by the first member and the second member by fitting threads together which are provided on the first member and the second member, respectively.

6. The vibration generating device according to claim 1, wherein the driving device changes at least one of the first frequency, the second frequency, or the third frequency.

7. The vibration generating device according to claim 1 wherein the driving device changes the third frequency and does not change the first frequency or the second frequency.

8. The vibration generating device according to claim 1, wherein the housing is of a pen type.

9. A vibration generating device comprising:

a vibrator; and a driving device configured to switch between a first period and a second period at a third frequency, the first period being a period during which a first signal having a first frequency of 100 Hz or higher and 400 Hz or lower is supplied to the vibrator, the second period being a period during which a second signal having a second frequency that is lower than the first frequency and is 10 Hz or higher and 250 Hz or lower is supplied to the vibrator, the third frequency being 1 Hz or higher and 100 Hz or less, wherein the vibrator includes:

a piezoelectric element including a piezoelectric layer, and a first electrode and a second electrode sandwiching the piezoelectric layer in a first direction, the piezoelectric element expanding and contracting in a second direction orthogonal to the first direction when the first signal and the second signal are supplied between the first electrode and the second electrode;

a vibration plate to which the piezoelectric element is fixed; and a housing including a frame body surrounding the vibrating plate and the piezoelectric element when viewed from the first direction, the frame body having a rectangle planar shape when viewed from the first direction, the housing fixing the vibrating plate at both ends of the vibrating plate in the second direction, and making both ends of the vibrating plate in a third direction orthogonal to the first direction and the second direction to be free ends separated from the housing.

10. The vibration generating device according to claim 1, wherein the vibrator includes a plurality of piezoelectric elements arranged in parallel in the first direction, and the first member and the second member sandwich the plurality of piezoelectric elements in the first direction.

* * * * *